(12) United States Patent
Morra

(10) Patent No.: US 12,524,430 B2
(45) Date of Patent: Jan. 13, 2026

(54) METHOD, DEVICES AND SYSTEM FOR DATA EXCHANGE BETWEEN A DISTRIBUTED DATABASE SYSTEM AND DEVICES

(71) Applicant: Siemens Aktiengesellschaft, Munich (DE)

(72) Inventor: Carlos Morra, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 110 days.

(21) Appl. No.: 18/021,999

(22) PCT Filed: Aug. 6, 2021

(86) PCT No.: PCT/EP2021/071967
§ 371 (c)(1),
(2) Date: Feb. 17, 2023

(87) PCT Pub. No.: WO2022/037969
PCT Pub. Date: Feb. 24, 2022

(65) Prior Publication Data
US 2023/0359642 A1   Nov. 9, 2023

(30) Foreign Application Priority Data
Aug. 21, 2020 (EP) .................................. 20192061

(51) Int. Cl.
*G06F 16/00* (2019.01)
*G06F 16/25* (2019.01)
*G06F 21/60* (2013.01)

(52) U.S. Cl.
CPC .......... *G06F 16/258* (2019.01); *G06F 21/602* (2013.01)

(58) Field of Classification Search
CPC .............................. G06F 16/258; G06F 21/602
(Continued)

(56) References Cited

U.S. PATENT DOCUMENTS 6,601,065 B1   7/2003  Nelson et al.
7,240,251 B2 *  7/2007  Popescu ................... H04L 1/24
                                                      714/704
(Continued)

FOREIGN PATENT DOCUMENTS

CN           1777893 A     5/2006
CN         102016890 A     4/2011
(Continued)

OTHER PUBLICATIONS

Needham Roger M et al: "Using encryption for authentication in large networks of computers", ACM: Communications of the ACM, vol. 21, No. 12, Dec. 1978, XP058231706; 1978.
(Continued)

*Primary Examiner* — Monica M Pyo
(74) *Attorney, Agent, or Firm* — Schmeiser, Olsen & Watts, LLP

(57) ABSTRACT

A gateway or a network adapter allows legacy devices to be connected to a distributed database system such as a blockchain without having to change any configuration. Unique cryptographic data is associated with the gateway I network adapter. To improve the availability of the coupling, an additional gateway or additional network adapter with identical cryptographic data is provided, wherein never both couplings are simultaneously active for preventing replications or ensuring the uniqueness of the cryptographic data. The availability of the active coupling is monitored using a state synchronization channel. Alternatively, the monitoring can also be effected by a test whether data sent by the legacy devices are successfully stored within a certain period of time or number of data blocks in the blockchain. In the event of an interference of the active coupling, the previously inactive gateway I network adapter assumes the coupling of the legacy devices and the blockchain.

21 Claims, 3 Drawing Sheets

Figure 1:
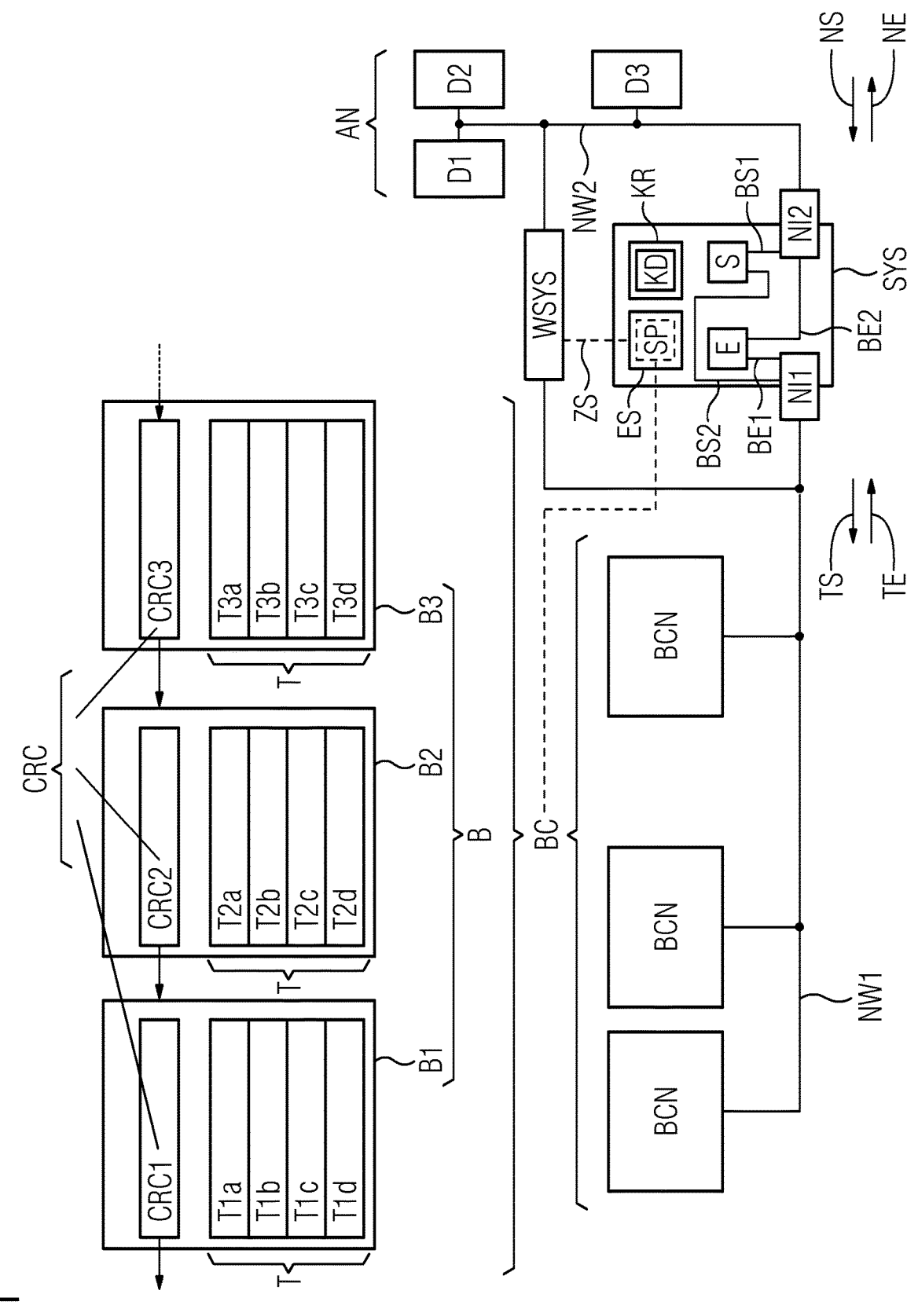

(58) Field of Classification Search
USPC .......................................................... 707/756
See application file for complete search history.

(56) References Cited

U.S. PATENT DOCUMENTS

| | | | |
|---|---|---|---|
| 10,972,942 B2* | 4/2021 | Ibek | .................... H04L 41/5009 |
| 2004/0249788 A1 | 12/2004 | Dant | |
| 2014/0053078 A1* | 2/2014 | Kannan | .................. H04W 4/21 |
| | | | 715/748 |
| 2014/0324708 A1* | 10/2014 | McCauley | .......... H04W 12/068 |
| | | | 705/72 |
| 2020/0029250 A1* | 1/2020 | Ibek | .................... H04L 41/0893 |
| 2020/0228316 A1 | 7/2020 | Cahill | |
| 2021/0037100 A1 | 2/2021 | Jetzfellner | |
| 2021/0271665 A1 | 9/2021 | Jetzfellner | |

FOREIGN PATENT DOCUMENTS

| | | |
|---|---|---|
| EP | 3595267 A1 | 1/2020 |
| WO | 2009108979 A2 | 9/2009 |
| WO | 2019201461 A1 | 10/2019 |
| WO | 2020011491 A1 | 1/2020 |

OTHER PUBLICATIONS

PCT International Search Report and Written Opinion of International Searching Authority mailed 21.06.2022 corresponding to PCT International Application No. PCT/EP2021/071967 filed Aug. 6, 2021.
Anderson Ross: "Security Engineering. A Guide to Building Dependable Distributed Systems"; Wiley, Jan. 2001; 2001.
Leemon Baird "Overview of Swirlds Hashgraph", May 31, 2016; 2016.
Antonopoulos Andreas M: "Mastering Bitcoin: Unlocking Digital Cryptocurrencies" ★ Reilly, First edition discloses at section Transaction Age, Fees, and Priority, 2014; 2014.
Diedrich, Henning "Ethereum: Blockchains, Digital Assets, Smart Contracts, Decentralized Autonomous Organizations" CreateSpace Independent Publishing Platform, Sep. 8, 2016 // ISBN-10: 1523930470 // ISBN-13: 978-1523930470.
Leemon Baird "The Swirlds Hashgraph Consensus Algorithm: Fair, Fast, Byzantine Fault Tolerance", Swirlds Tech Report SWIRLDS-TR-2016-01, May 31, 2016; 2016.
"The Ethereum Book Project/Mastering Ethereum" https://github.com/ethereumbook/ethereumbook, Stand Oct. 5, 2017.
BLOCKCHAINHUB: "Blockchain Oracles", https://blockchainhub.net/blockchain-oracles/; 2018.
Ao Yong et al:; "Research Progress on Data Integration and Sharing in Distributed Databases"; Jan. 5, 2020.

* cited by examiner

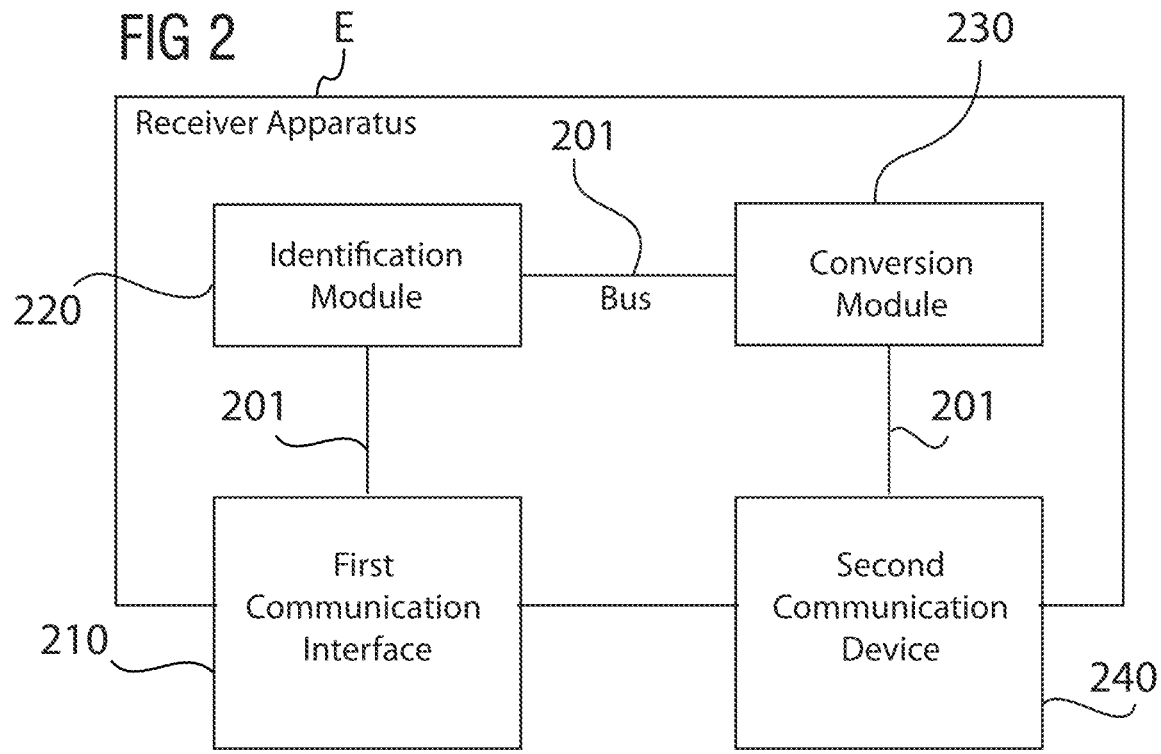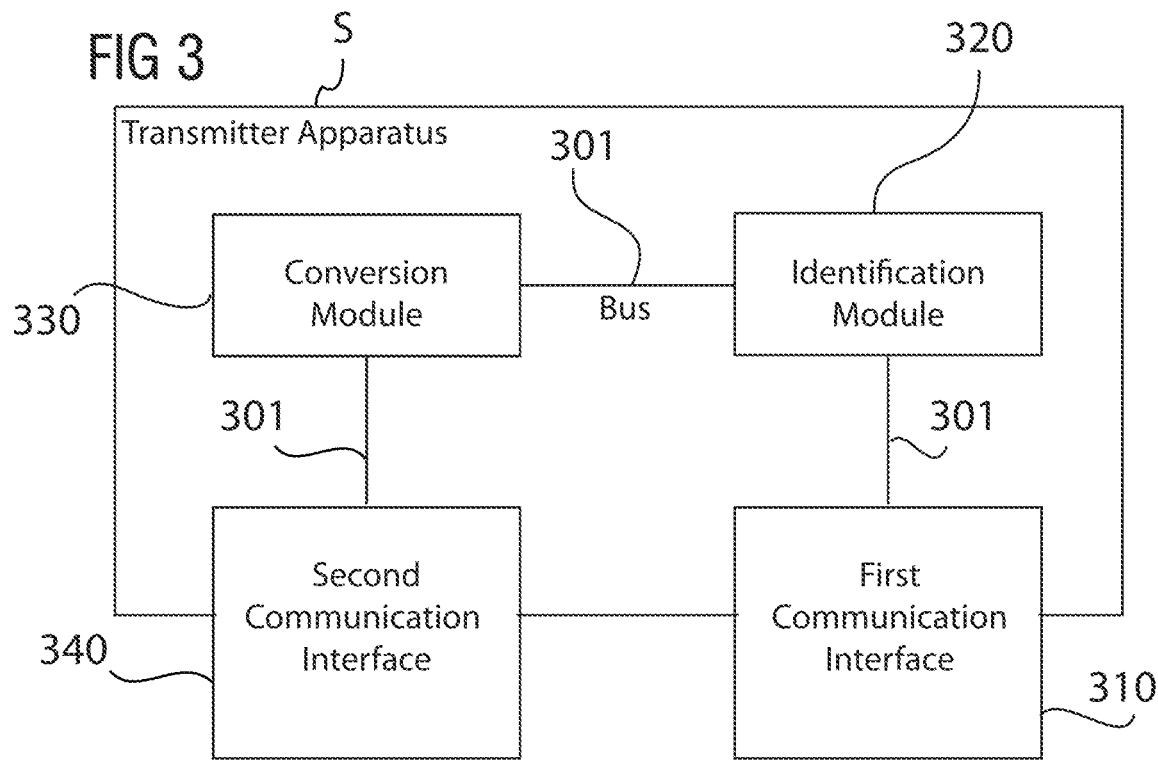

METHOD, DEVICES AND SYSTEM FOR DATA EXCHANGE BETWEEN A DISTRIBUTED DATABASE SYSTEM AND DEVICES

CROSS-REFERENCE TO RELATED APPLICATIONS

This application claims priority to PCT Application No. PCT/EP2021/071967, having a filing date of Aug. 6, 2021, which claims priority to EP Application Serial No. 20192061.8, having a filing date of Aug. 21, 2020, the entire contents both of which are hereby incorporated by reference.

FIELD OF TECHNOLOGY

The following relates to a method, devices and system for data exchange between a distributed database system and devices.

BACKGROUND

Devices, such as field devices and production devices, are networked to an increasing extent and, for example, can be supplied/operated by different operators. Inter alia, command sequences are transmitted to these devices, which can be executed by said devices.

SUMMARY

An aspect relates to the identification of an issue from the conventional art, and the establishment of a technical solution to this issue.

Old devices and new IT infrastructures cannot communicate, unless further action is taken. The reasons for this are extremely complex and multi-layered, and will generally not become evident, even upon a second or third scrutiny. In general, an exceptional in-depth knowledge of technical circumstances and solutions is required, with respect to both old devices and new IT infrastructures and, moreover, with respect to technical options which will permit communication. This is further handicapped by the fact that all the potential resources concerned have developed from a particular context of requirements and applications, and bear the imprint of the latter in a wide variety of ways. As a result of even the most subtle differences in their characteristics, the employment thereof other than in a previously-known context can generate surprisingly unexpected and unfamiliar problems, which will at least handicap trouble-free interaction, and can result in performance impairments.

Technology employing blockchains or distributed ledgers—also described as distributed ledger technology, or "DLT"—is currently the subject of intensive discussion, and can particularly be embodied in the form of a distributed database system or a network application. In addition to applications for decentralized payment systems (e.g., Bitcoin), new application possibilities are being developed in the finance industry. In particular, transactions between companies can be executed in a manipulation-proof manner, without the services of an intermediary or a clearing house. This facilitates new business models which do not involve a trusted intermediary, reduces transaction costs, and permits the flexible delivery of new digital services, without the necessity for any specially developed infrastructures or the establishment of relations of trust. A transaction data record (or, in short, a transaction) which is protected by a blockchain comprises e.g., program code, which can also be described as a "smart contract".

Unless indicated otherwise in the following description, the terms "execute", "calculate", "computer-assisted", "compute", "establish", "generate", "configure", "reconstruct" or similar refer to actions and/or processes and/or process steps for the modification and/or generation of data and/or for the transformation of data into other data, wherein these data can particularly be represented or present in the form of physical variables, for example in the form of electric pulses. In particular, the term "computer" is to be interpreted in the broadest possible sense, and particularly encompasses all electronic devices having data-processing properties. Accordingly, computers can be, for example, personal computers, servers, programmable logic controllers (PLCs), handheld computer systems, pocket PC devices, mobile telephone devices and other communication devices having the facility for computer-assisted data processing, processors and other electronic devices for data processing.

In the context of embodiments of the invention, for example, the term "computer-assisted" can be understood as the implementation of a method wherein, in particular, a processor executes at least one process step of the method. For example, the term "computer-assisted" is also to be understood as "computer-implemented".

In the context of embodiments of the invention, for example, the term "processor" can be understood as a machine or an electronic circuit. A processor can particularly be a central processing unit (CPU), a microprocessor or a microcontroller, for example an application-specific integrated circuit or a digital signal processor, potentially in combination with a storage unit for the saving of program commands, etc., A processor can also be, for example, an IC (integrated circuit), particularly a FPGA (field programmable gate array) or an ASIC (application-specific integrated circuit), or a digital signal processor (DSP) or a graphic processing unit (GPU). A processor can also be understood as a virtual processor, a virtual machine or a soft CPU. This can also be, for example, a programmable processor which is equipped with configuration steps for the execution of the above-mentioned method according to embodiments of the invention, or is configured with configuration steps such that the programmable controller embodies the features, according to embodiments of the invention, of the method, the components, the modules or other aspects and/or sub-aspects of embodiments of the invention.

In the context of embodiments of the invention, for example, the term "storage unit", "storage module" or similar can be understood as a volatile memory in the form of a working memory (random access memory, or RAM), or a permanent memory such as a hard disk or a data medium. In the context of embodiments of the invention, for example, the term "module" can be understood as a processor and/or a storage unit for saving program commands. For example, the processor is specially designed to execute program commands such that the processor executes functions for the implementation or realization of the method according to embodiments of the invention, or of a step of the method according to embodiments of the invention. A module can also be, for example, a node of the distributed database system which, for example, embodies the specific functions/features of a corresponding module. Respective modules can also be configured, for example, in the form of separate or standalone modules. To this end, for example, the corresponding modules can comprise further elements. These elements are, for example, one or more interfaces (e.g., database interfaces, communication interfaces—e.g. a network interface, WLAN interface) and/or an evaluation unit (e.g. a processor) and/or a storage unit. By means of interfaces, for example, data can be exchanged (e.g., received, transmitted, sent or provided). By means of the evaluation unit, for example, data can be compared, checked, processed, classified or calculated, for example in a computer-assisted and/or an automatic manner. By means of the storage unit, data can be saved, retrieved or provided, for example in a computer-assisted and/or an automatic manner.

In the context of embodiments of the invention, for example, particularly with respect to data and/or information, the term "comprise" can be understood as the (computer-assisted) saving of a corresponding item of information or a corresponding item of data in a data structure/data record, which, in turn, is saved e.g., in a storage unit.

In the context of embodiments of the invention, for example, particularly with respect to data and/or information, the term "assignment" can be understood, for example as a (computer-assisted) assignment of data and/or information. To this end, for example, a second item of data can be assigned to a first item of data by means of a memory address or a unique identifier (UID), wherein e.g. the first item of data is saved in a data record, together with the memory address or the unique identifier of the second item of data.

In the context of embodiments of the invention, for example, particularly with respect to data and/or information, the term "provision" can be understood, for example, as computer-assisted provision. This provision is executed, for example, via an interface (e.g., a database interface, a network interface, or an interface to a storage unit). Via this interface, for example, by way of provision, corresponding data and/or information can be transmitted and/or sent and/or retrieved and/or received.

In the context of embodiments of the invention, for example, the term "provision" can also be understood as the loading or saving, for example of a transaction, together with corresponding data. This can be executed, for example, on or by means of a storage unit. The term "provision", for example, can also be understood as the transmission (or sending, or communication) of corresponding data from one node to another node of the block chain or the distributed database system (or the infrastructure thereof), or of the network application.

In the context of embodiments of the invention, for example, the term "checksum"—for example a data block checksum, a node checksum, a transaction checksum, a chained checksum or similar—can be understood, for example, as a cryptographic checksum or a cryptographic hash or hash value which, particularly by means of a cryptographic hash function employing a data record and/or data and/or one or more transactions and/or a subregion of a data block (e.g. the block header of a block in a blockchain or the data block header of a data block in the distributed database system (or network application), or only a proportion of the transactions in a data block, is generated or calculated. In particular, a checksum can comprise checksum(s) and/or hash values in a hash tree (e.g., a Merkle tree or Patricia tree). Moreover, in particular, this can be understood as a digital signature or a cryptographic message authentication code. By means of checksums, for example, at different levels of the database system, cryptographic protection/manipulation protection for transactions and the data (records) saved therein can be executed. If, for example, stringent security is required, checksums are generated and checked, for example, at transaction level. If less stringent security is required, checksums can be generated and checked, for example, at block level (e.g., on the entire data block or only a part of the data block and/or on only a part of transactions).

In the context of embodiments of the invention, the term "data block checksum" can be understood as a checksum which is calculated, for example, by reference to all or part of the transactions in a data block. A node, for example, can then check the integrity/authenticity of the corresponding part of a data block by means of the data block checksum. Additionally or alternatively, in particular, the data block checksum can be also be formed by the employment of transactions from a preceding data block/precursor data block of the data block. The data block checksum, in particular, can also be embodied by means of a hash tree, for example a Merkle tree [1] or a Patricia tree, wherein the data block checksum, in particular, is the root checksum of the Merkle tree or of a Patricia tree. In particular, transactions are secured by means of further checksums from the Merkle tree or Patricia tree (e.g., by the application of transaction checksums) wherein, in particular, the further checksums are leaf nodes in the Merkle tree or Patricia tree. The data block checksum, for example, can thus secure transactions, wherein the root checksum is formed from the further checksums. The data block checksum, in particular, can be calculated for transactions in a specific data block of the data blocks. In particular, a data block checksum of this type can address a subsequent data block to the specific data block concerned, in order to interlink this subsequent data block, for example with its preceding data blocks, thus permitting, in particular, the integrity of the distributed database system (or of the network application) to be confirmed. As a result, for example, the data block checksum can assume the function of the chained checksum or can address the chained checksum. The header of a data block (e.g., of a new data block, or of the data block which has been generated for the data block checksum) can comprise, for example, the data block checksum.

In the context of embodiments of the invention, the term "transaction checksum" can be understood as a checksum which, in particular, is formed by reference to a transaction in a data block. Additionally, for example, calculation of a data block checksum for a corresponding data block can be accelerated on the grounds that, for example, transaction checksums previously calculated for this purpose can be employed in the manner of leaf nodes, e.g., of a Merkle tree.

In the context of embodiments of the invention, the term "chained checksum" can be understood as a checksum in which, in particular, a respective data block of the distributed database system (or network application) indicates or references the previous data block in the distributed database system (or network application) (specifically described in the specialized literature, in many cases, as the "previous block hash" [1]. To this end, in particular for the corresponding previous data block, a corresponding chained checksum is generated. As a chained checksum, for example, a transaction checksum or the data block checksum of a data block (i.e., an existing data block of the distributed database system or network application) can be employed, in order to interlink a new data block with an (existing) data block in the distributed database system (or network application). However, it is also possible, for example, for a checksum to be formed by reference to a header of the previous data block or the entire previous data block and employed as a chained checksum. This can also be calculated, for example, for a number or all of the previous data blocks. It is also feasible, for example, for the chained checksum to be formed by reference to the header of a data block and the data block checksum. However, a respective data block in the distributed database system comprises one chained checksum in each case, which has been calculated for a preceding data block, more still for the data block which immediately precedes the relevant data block, or which refers thereto. It is also possible, for example, that a corresponding chained checksum is formed by reference to only part of the corresponding data block (e.g., the previous data block). As a result, for example, a data block can be constituted which comprises an integrity-protected part and an unprotected part. Thus, for example, a data block can be formed, the integrity-protected part of which is uneditable, and the unprotected part of which can still be edited at a later date. By the term integrity-protected, it is particularly to be understood that any modification to integrity-protected data is identifiable by means of a checksum. As indicated above, for example, in place of the distributed database system, a network application can be employed in a similar manner.

In particular, data which, for example, are saved in a data block transaction, can be provided in a variety of ways. Rather than data, e.g., user data such as measurement data or data/ownership data with respect to assets, for example, a transaction in a data block can comprise only the checksum for said data. The corresponding checksum can be embodied in a variety of ways. This can include, e.g. a corresponding data block checksum of a data block (with the corresponding data) of another database, or of the distributed database system or network application, a transaction checksum of a data block with corresponding data (from the distributed database system or another database), or a data checksum which has been generated by reference to data.

In addition, the corresponding transaction can further comprise a reference or indication for a storage location (e.g. a file server address and instructions for the location of the corresponding data on the file server; or an address of another distributed database which comprises the data). The corresponding data might also have been provided, for example, in a further transaction of a further data block in the distributed database system (or network application) (e.g. if the corresponding data and the associated checksums are included in different data blocks). However, it is also conceivable, for example, for these data to be delivered via another communication channel (e.g., via another database and/or a cryptographically secured communication channel).

Additionally to the checksum, for example, an additional data record (e.g. a reference or indication for a storage location) can also be saved in the corresponding transactions, which particularly indicates a storage location from which data can be retrieved. This is particularly advantageous for the restriction of data in the blockchain or the distributed database system (or network application) to the smallest possible volume.

In the context of embodiments of the invention, the term "security protected", for example, can be understood as a form of protection which, in particular, is executed by a cryptographic method. This can be embodied, for example, by an employment of the distributed database system (or network application) for the provision, transmission or sending of corresponding data/transactions. This is achieved by a combination of various (cryptographic) checksums wherein, in particular, these interact in a synergistic manner such that, for example, the security or cryptographic security of transaction data is improve. In other words, in the context of embodiments of the invention, the term "security protected" can particularly be understood as "cryptographically protected" and/or "manipulation-proof", wherein the term "manipulation-proof" can also be described as "integrity-protected".

In the context of embodiments of the invention, for example, the term "interlinking of data blocks in a distributed database system" (or network application) can particularly be understood in that each of the data blocks comprises information (e.g. a chained checksum) which refers to or references another data block or a number of other data blocks in the distributed database system (or network application) [1] [4] [5].

In the context of embodiments of the invention, for example, the term "insertion in the distributed database system" (or network application), or similar, can particularly be understood as the communication of a transaction or transactions, or of a data block with its associated transactions), to one or more nodes in a distributed database system (or network application). If these transactions, for example, are successfully validated (e.g. by the node/nodes), these transactions, particularly in the form of a new data block, are interlinked with at least one existing data block in the distributed database system (or network application) [1] [4] [5]. To this end, the corresponding transactions, for example, are saved in a new data block. In particular, this validation and/or interlinking can be executed by a trusted node (e.g. a mining node, a blockchain oracle or a blockchain platform). In particular, a blockchain platform can be understood as a blockchain as service, of the type which is particularly provided by Microsoft or IBM. In particular, a trusted node and/or a node can respectively save a node checksum (e.g. a digital signature) in a data block (e.g. in a data block which has been validated and generated thereby, and which is then interlinked), particularly in order to permit the identifiability of the originator of the data block and/or to permit the identifiability of the node. This node checksum, for example, thus indicates which nodes have interlinked the corresponding data block with at least one other data block in the distributed database system (or network application).

In the context of embodiments of the invention, for example, the term "transaction" or "transactions" is to be understood as a smart contract [4], a data structure [5] or a transaction data record which, in particular, comprises one or more transactions respectively. In the context of embodiments of the invention, for example, the term "transaction" or "transactions" is also to be understood as transaction data in a data block of a blockchain. In particular, a transaction can comprise program code which, for example, embodies a smart contract. In the context of embodiments of the invention, for example, the term transaction can also be understood as a control transaction and/or a confirmation transaction. Alternatively, for example, a transaction can comprise a data structure for the saving of data (e.g., control commands and/or contractual data and/or other data, such as video data, user data, measurement data, etc.). In the context of embodiments of the invention, for example, a "transaction" can also be a message or a communication message or can be described as such. A message, for example, describes a transaction wherein, for example, the message comprises control commands for the actuation of devices and/or conditions (e.g., stipulated requirements) for the execution of control commands.

In particular, the terms "saving of transactions in data blocks", "saving of transactions", or similar, are to be understood either as direct saving or as indirect saving. By the term direct saving, for example, it can be understood that the corresponding data block (of the distributed database system or network application), or the corresponding transaction in the distributed database system (or network application), comprises the respective data. By the term indirect saving, for example, it can be understood that the corresponding data block or the corresponding transaction comprises a checksum and, optionally, an additional data record (e.g. a reference or indication for a storage location) for the corresponding data, and that, accordingly, the corresponding data are not saved directly in the data block (or transaction) (and thus only a checksum for said data is saved). In particular, for the saving of transactions in data blocks, for example, these checksums are validated, as described for example with reference to "insertion in the distributed database system" (or network application).

In the context of embodiments of the invention, for example, the term "program code" (e.g., a smart contract) can be understood as a program command or a number of program commands which, in particular, are saved in one or more transactions. The program code, in particular, is executable, and is executed, for example, by the distributed database system (or network application). This can be achieved, for example, by means of an execution environment (e.g., of a virtual machine), wherein the execution environment or program code are Turing-complete. Program code is executed by the infrastructure of the distributed database system (or of the network application) [4] [5]. For example, a virtual machine is embodied by the infrastructure of the distributed database system (or network application).

In the context of embodiments of the invention, for example, the term "smart contract" can be understood as an executable program code [4] [5] (c.f. in particular the definition of "program code"). The smart contract is saved in a transaction of a distributed database system (e.g., a blockchain) or of a network application, for example in a data block of the distributed data base system (or network application). For example, the smart contract can be executed in the same manner as described with respect to the definition of "program code", particularly in the context of embodiments of the invention.

In the context of embodiments of the invention, the term "smart contract process" or "smart contract" is particularly to be understood as including the execution of program code or a smart contract in a process by the distributed database system or the infrastructure thereof (or by the network application and/or the corresponding infrastructure of the network application).

In the context of embodiments of the invention, for example, the term "proof-of-work" can be understood as the resolution of a computationally complex task, which is particularly dependent upon data block content/the content of a specific transaction [1] [4] [5]. A computationally complex task of this type, for example, is also described as a cryptographic puzzle.

In the context of embodiments of the invention, for example, the term "network application" can be understood as a decentralized distributed database, a distributed database system, a distributed database, a peer-to-peer application, a distributed memory management system, a blockchain, a distributed ledger, a distributed memory system, a distributed ledger technology-(DLT) based system (DLTS), a revision-proof database system, a cloud, a cloud service, a blockchain in a cloud or a peer-to-peer database. For example, a network application (also described as a system application) can be a distributed database system, which is embodied e.g., by means of a blockchain or a distributed ledger. Different implementations of a blockchain or a DLTS, for example, can also be implemented, such as e.g., a blockchain or a DLTS which is implemented by means of a directed acyclic graph (DAG), a cryptographic puzzle, a hashgraph, or a combination of the above-mentioned implementation variants [6] [7]. Additionally, for example, different consensus algorithms can be implemented. These can include, for example, a consensus algorithm which is implemented by means of a cryptographic puzzle, gossip about gossip, virtual voting, or a combination of the above-mentioned algorithms (e.g., gossip about gossip combined with virtual voting) [6] [7]. If, for example, a blockchain is employed, this can particularly be implemented by means of a Bitcoin-based embodiment or an Ethereum-based embodiment [1] [4] [5].

The term "distributed database system" or "network application", for example, can also be understood as a distributed database system or network application, at least a proportion of the nodes and/or devices and/or infrastructure of which are embodied by a cloud. For example, the corresponding components are embodied in the form of nodes/devices in the cloud (e.g., as virtual nodes in a virtual machine). This can be executed, for example, by means of VM-ware, Amazon Web Services or Microsoft Azure. On the grounds of the high flexibility of the above-mentioned implementation variants, in particular, sub-aspects of the above-mentioned implementation variants can also be mutually combined, e.g., by the employment of a hashgraph as a blockchain, wherein the blockchain itself e.g. can also be blockless.

If, for example, a directed acyclic graph (DAG) is employed (e.g., IOTA or Tangle), transactions, or blocks, or nodes of the graph are specifically interconnected by means of oriented edges. The term acyclic, in particular, signifies that there are no oriented loops in the graph.

A distributed database system or network application can be, for example, a public distributed database system or a public network application (e.g., a public blockchain), or a closed (private) distributed database system or closed network application (e.g. a private blockchain).

In the case, for example, of a public distributed database system or a public network application, this means that new nodes and/or devices can be admitted to the distributed database system or network application, or accepted by the latter, with no proofs of eligibility or authentication, or with no reference information or credentials. In such a case, in particular, the operators of nodes and/or devices can remain anonymous.

If the distributed database system or network application, for example, is a closed distributed database system, new nodes and/or devices will require, for example, valid proof of eligibility and/or valid authentication information and/or valid credentials and/or valid reference information, if they are to be admitted to the distributed database system or accepted by the latter.

A distributed database system or network application can also be, for example, a distributed communication system for the exchange of data. This can be, for example, a network or a peer-to-peer network.

A/the distributed database system can also be, for example, a decentralized distributed database system and/or a decentralized distributed communication system.

A "network application" can also be, for example, a network application infrastructure, or the network application can comprise a corresponding network application infrastructure. This infrastructure can comprise, for example, nodes and/or communication networks and/or data interfaces and/or further components, which permit the embodiment or execution of the network application. The network application can be e.g., a distributed network application (e.g. a distributed peer-to-peer application or a distributed database system) which is executed, for example, on multiple nodes of the network application infrastructure.

In the context of embodiments of the invention, for example, the term "distributed database system", which can also be described, for example, as a distributed database, can be understood as a decentralized distributed database, a block chain, a distributed ledger, a distributed memory system, a distributed ledger technology-(DLT) based system (DLTS), a revision-proof database system, a cloud, a cloud service, a blockchain in a cloud or a peer-to-peer database. Different implementations of a blockchain or a DLTS, for example, can also be implemented, such as e.g. a blockchain or a DLTS which is implemented by means of a directed acyclic graph (DAG), a cryptographic puzzle, a hashgraph, or a combination of the above-mentioned implementation variants [6] [7]. Additionally, for example, different consensus algorithms can be implemented. These can include, for example, a consensus algorithm which is implemented by means of a cryptographic puzzle, gossip about gossip, virtual voting, or a combination of the above-mentioned algorithms (e.g. gossip about gossip combined with virtual voting) [6] [7]. If, for example, a blockchain is employed, this can particularly be implemented by means of a Bitcoin-based embodiment or an Ethereum-based embodiment [1] [4] [5]. The term "distributed database system", for example, can also be understood as a distributed database system, at least a proportion of the nodes and/or devices and/or infrastructure of which are embodied by a cloud. For example, the corresponding components are embodied in the form of nodes/devices in the cloud (e.g. as virtual nodes in a virtual machine). This can be executed, for example, by means of VM-ware, Amazon Web Services or Microsoft Azure. On the grounds of the high flexibility of the above-mentioned implementation variants, in particular, sub-aspects of the above-mentioned implementation variants can also be mutually combined, e.g. by the employment of a hashgraph as a blockchain, wherein the blockchain itself e.g. can also be blockless.

If, for example, a directed acyclic graph (DAG) is employed (e.g. IOTA or Tangle), transactions, or blocks, or nodes of the graph are specifically interconnected by means of oriented edges. This signifies, in particular, that edges (desirably all edges) are oriented in the same direction (desirably always the same direction), in a similar manner to that which applies e.g. to time. In other words, in particular, it is not possible to run or start-up transactions or blocks or nodes of the graph in reverse (i.e. against the common and shared direction). The term acyclic, in particular, signifies that no loops are included in the graph cycle.

A distributed database system can be, for example, a public distributed database system (e.g. a public blockchain), or a closed (private) distributed database system (e.g. a private blockchain).

In the case, for example, of a public distributed database system, this means that new nodes and/or devices can be admitted to the distributed database system or network application, or accepted by the latter, with no proofs of eligibility or authentication, or with no reference information or credentials. In such a case, in particular, the operators of nodes and/or devices can remain anonymous.

If the distributed database system, for example, is a closed distributed database system, new nodes and/or devices will require, for example, valid proof of eligibility and/or valid authentication information and/or valid credentials and/or valid reference information, if they are to be admitted to the distributed database system or accepted by the latter.

A distributed database system can also be, for example, a distributed communication system for the exchange of data. This can be, for example, a network or a peer-to-peer network. Alternatively or additionally, embodiments of the invention can also be embodied, for example, in the form of a peer-to-peer application, rather than a distributed database system.

In the context of embodiments of the invention, for example, the term "data block", which can also be described as an "element" or "block", particularly according to the context and the embodiment thereof, is to be understood as a data block in a distributed database system (e.g. a blockchain or a peer-to-peer database) or a network application which, in particular, is embodied in the form of a data structure and which, in each case, comprises one of the transactions or a number of the transactions. In one implementation, for example, the database (or database system) can be a DLT-based system (DTLS) or a blockchain, and a data block can be a block in the blockchain or DLTS. A data block can comprise, for example, information on the size of the data block (data size in bytes), a data block header, a transaction counter and one or more transactions [1]. The data block header can comprise, for example, a version number, a chained checksum, a data block checksum, a time stamp, proof-of-work and a nonce (a one-off value, random value or counter value, which is employed by way of proof-of-work) [1] [4] [5]. A data block can also comprise, for example, only a specific memory area or address area for all data which are saved in the distributed database system. It is thus possible, for example, for blockless distributed database systems, such as e.g. the IoT Chain (ITC), IOTA and Byteball, to be embodied. In particular, the functionalities of blocks in a blockchain and transactions are mutually combined such that e.g. transactions themselves secure the sequence or chain of transactions (in the distributed database system) (which are thus saved, in particular, in a security-protected manner). To this end, for example, transactions themselves can be mutually interlinked by means of a chained checksum wherein, a separate checksum or the transaction checksum is employed as a chained checksum for one or more transactions and, upon the saving of a new transaction, is saved in the distributed database system together with the corresponding new transaction. In an embodiment of this type, a data block can also comprise, for example, one or more transactions wherein, in the simplest case, for example, one data block corresponds to one transaction.

In the context of embodiments of the invention, for example, the term "nonce" can be understood as a cryptographic nonce (abbreviation for: "used only once" [2] or "number used once" [3]). In particular, the term "nonce" describes a combination of individual digits or letters, which is employed on a one-off basis in the relevant context (e.g. a transaction or data transmission).

In the context of embodiments of the invention, for example, the term "previous data blocks to a (specific) data block in the distributed database system" can be understood as the data block in the distributed database system which, in particular, directly precedes a (specific) data block. Alternatively, the term "previous data blocks to a (specific) data block in the distributed database system" can also be particularly understood as all the data blocks in the distributed database system which precede the specific data block. Thus, for example, the chained checksum or transaction checksum, in particular, can be formed by reference only to the data block which directly precedes the specific data block (or the transactions thereof), or by reference to all the data blocks (or the transactions thereof) which precede the first data block.

In the context of embodiments of the invention, for example, the terms "blockchain node", "node", "node of a distributed database system or network application" or similar can be understood as devices (e.g. field devices, mobile telephones), computers, smartphones, clients or participants which execute operations on/using the distributed database system (e.g. a blockchain) [1] [4] [5]. Nodes of this type, for example, can execute transactions in a network application or a distributed database system, or the data blocks thereof, or can insert or interlink new data blocks with new transactions in the distributed database system (or in the network application), in the form of new data blocks. In particular, this validation and/or interlinking can be executed by means of a trusted node (e.g. a mining node), or exclusively by means of trusted nodes. A trusted node is, for example, a node which is provided with additional security features (e.g. firewalls, access restrictions to the node, etc.), in order to prevent any manipulation of the node. Alternatively or additionally, for example, a trusted node, upon the interlinking of a new data block with the distributed database system, can save a node checksum (e.g. a digital signature or a certificate) in the new data block. Thus, in particular, evidence can be provided to the effect that the corresponding data block has been inserted by means of a specific node, or the origin thereof can be indicated. Devices (e.g. the corresponding device) can be, for example, devices in a technical system and/or an industrial installation and/or in an automation network and/or in a production installation which, in particular, can also be a node in the distributed database system (or network application). Devices, for example, can be field devices or devices in the Internet of things which, in particular, can also comprise a node of the distributed database system (or network application). Nodes, for example, can also comprise at least one processor, e.g. in order to permit the execution of their computer-implemented functionality.

In the context of embodiments of the invention, for example, the term "blockchain oracle", or similar, can be understood as nodes, devices or computers which e.g. are provided with a security module which, for example, comprises software security mechanisms (e.g. cryptographic methods), mechanical protective devices (e.g. a lockable housing) or electrical protective devices (e.g. tamper-proofing or a protection system), by means of which data in the security module are deleted in the event of any unauthorized use/processing of the blockchain oracle. The security module can comprise, for example, cryptographic keys, which are required for the calculation of checksums (e.g. transaction checksums or node checksums).

In the context of embodiments of the invention, for example, the term "computer" or "device" can be understood as a computer (system), a client, a smartphone, a device or a server which, in each case, are arranged externally to the blockchain and do not form an element of the infrastructure of the distributed database system (or network application), or which form part of a separate infrastructure. A device can be, for example, a production device and/or an electromechanical device and/or an electronic device and/or a device in an automation network (e.g. for industrial engineering installations, production installations, energy or resource distribution installations), wherein these devices, in particular, do not have the facility for direct communication with the distributed database system or network application.

A device of this type, which is external to the distributed database system (or network application), for example, cannot access data in the distributed database system (or network application), for example on the grounds that the device is too old, and has neither the requisite cryptographic and/or IT security capabilities, nor the requisite compatibility with the data format of the distributed database system (or network application). This prevents any communication between new IT infrastructures and old devices.

This problem can be solved, or at least alleviated, by the employment of a conversion module—also described as a blockchain bridge or BC bridge. For example, a conversion module of this type can execute a check as to whether the device to which data are assigned has the capability for the processing of data, or a proportion of data. The result of the corresponding test can then be saved e.g. in the form of the conversion test result. Data can be, for example, the first messages or first message, or the message content of the first message, or data on a communication link.

An example of a conversion module of this type is disclosed in the published European Patent n° EP 3595267 and in international patent application PCT/EP2019/065873, which has been published under n° WO 2020/011491.

In this manner, it is possible for a decentralized (blockchain-based) IT infrastructure to be coupled with old or legacy devices. In particular, coupling of such old devices to a new, blockchain-based infrastructure can be executed. This is advantageous, for example, for energy supply systems, the control of which can be converted to a blockchain infrastructure, without the necessity, however, for the replacement of each individual device in the existing energy supply system. This makes it possible, for example, e.g. by means of a blockchain, for messages (e.g. in transactions) containing control commands to be transmitted to individual devices, wherein the receiver apparatus is communicatively arranged between the devices and the distributed database system (or network application) and executes the assignment and/or transmission of the respective messages to a (corresponding) device. In particular, the corresponding message content or data are also converted into a data format which is compatible with a device. Additionally, for example, data or message content can be cryptographically checked and/or cryptographic protection can be removed (e.g. by the decryption of message content or data).

According to one finding of embodiments of the invention, decentralized blockchain-based infrastructures primarily originated in the financial/commercial sector, and bear the characteristic stamp of requirements in this environment. Requirements which, in an industrial environment, assume an importance ranging from high to very high such as, for example, safety or availability, have a far lower significance in a financial and commercial environment, or no significance at all.

In the light of these origins from a financial/commercial environment, the unambiguity of transactions is of very high significance, as ambiguous transactions in this environment must not occur under any circumstances. As a result, the latest decentralized blockchain-based infrastructures are embodied by platforms—also described as DLT platforms—the nodes of which comprise unambiguous cryptographic data, which permit unambiguous identification (e.g. of actors, receivers, transmitters, data, data records or transactions). Any ambiguous identifications are excluded.

According to the findings of embodiments of the invention, conversely, availability in the latest decentralized blockchain-based infrastructures is of secondary significance only. If the unambiguity of a financial transaction is only achievable at the expense of system performance, this is an acceptable consequence in the environment concerned, particularly in a context in which, in the financial sector or a commercial environment, transaction times of several days are, in any event, both customary and widespread.

According to the findings of embodiments of the invention, it proceeds from the above, inter alia, that the latest DLT platforms incorporate no mechanisms which, in the event of a failure of a node, will ensure high availability. Instead, the status of transactions on each node must be monitored, and transactions will identify a node in an unambiguous manner. As protection against the failure of a DLT platform, at most, multiple copies of the distributed ledger can be provided. In the event of the unavailability of a ledger which is currently in use, one of these copies is employed in place of the unavailable ledger. Copying of the complete ledger is time-consuming, complex and data-intensive. In a financial/commercial environment, this high complexity is not critical and, for example on the grounds of data security which is achieved by high redundancy, is also desirable and justified.

According to the findings of embodiments of the invention, this situation creates a problem in an industrial environment, if the latest conversion modules for the connection of old devices to decentralized blockchain-based infrastructures employ the same mechanisms. On the grounds of the requisite unambiguity of cryptographic data, the entire system can only be protected against the failure of a conversion module by the provision of multiple decentralized blockchain-based infrastructures arranged in parallel, to which each of the old devices is connected by a separate conversion module. This is very time-consuming and expensive and, in the event of the failure of a conversion module, on the grounds of the time-consuming switchover to one of the other decentralized blockchain-based infrastructures, results in a reduction in the availability of the overall system.

According to one aspect, embodiments of the invention relate to a system comprising:
at least one receiver apparatus or a transmitter apparatus;
a cryptography module;
an unambiguity confirmation module.

In a first embodiment, embodiments of the invention comprise at least one receiver apparatus. This retrieves a device status (e.g. fault state, operational state) from a device which is assigned to a corresponding first message or corresponding data (e.g. by means of the identification module or the second communication interface), wherein transmission to the assigned device is dependent upon the device status thus retrieved.

The receiver apparatus is advantageous in that, in particular, prior to the transmission of message content or data to the device, a check is executed as to whether e.g. the corresponding device is switched on or is ready for service. Thus, in particular, it can be prevented that messages are transmitted to devices which are in a fault state. If, for example, a message is not transmitted to the correspondingly assigned device (e.g. on the grounds that this is not permitted by the corresponding status of the device), a corresponding message or transaction, which comprises this device status (e.g. a fault state), can be transmitted to the distributed database system (or network application) or saved by the distributed database system (or network application).

In further embodiments of the receiver apparatus, the device status comprises a data record with respect to available device resources and/or current device properties.

In further embodiments of the receiver apparatus, transmission is executed to the corresponding device in the event that predefined requirements for the corresponding first message are fulfilled by the assigned device wherein, for example, the fulfilment of predefined requirements is checked by reference to the device status.

The receiver apparatus is advantageous in that, in particular, a check is executed as to whether a corresponding message is at all susceptible to processing by a device. If a corresponding message, for example, comprises control commands for the start-up or control of a generator or a reserve power plant, requirements can stipulate, for example, that a specific minimum quantity of energy is to be generated. Alternatively (i.e. in another application scenario), by means of predefined requirements, a specific precision of production or production time can be stipulated, which must be observed. These requirements, for example, can be checked by the receiver apparatus, wherein the correspondingly available device resources and/or the device status and/or the current device properties are checked (e.g. to the effect that the device is installed in the correct location, e.g. for the prevention of any breach of data protection regulations; to the effect that the device, or data which are processed by the device, are protected against access by unauthorized persons—e.g. cryptographically-particularly for the protection of corporate/production know-how). This check of stipulated requirements, which are saved e.g. in a corresponding data record, can be executed e.g. by the identification module, the conversion module, the second communication interface (e.g. a network interface) or an evaluation module of the receiver apparatus, which is arranged up-circuit of the communication interface (e.g. a network interface) of a communication bus of the receiver apparatus.

Stipulated requirements, for example, can also constitute or comprise predefined control commands wherein, for example, said predefined control commands stipulate that the latter must be executed, or have already been executed, by one of the devices or the device, before the corresponding data and/or messages or message content (e.g. converted message content or converted data) can be transmitted to devices. Alternatively or additionally, predefined control commands can also relate to further devices wherein, for example, said further devices are devices in a further automation network. In order to execute a check, for example, as to whether predefined control commands have already been executed, for example, corresponding messages or transactions in the distributed database system (or network application) can be read-out or checked which, for example, confirm the execution of predefined control commands. These corresponding messages or transactions, for example, for example, can be described as confirmation transactions, and are saved by the corresponding devices, for example further to the execution of predefined control commands, e.g. by means of the transmitter apparatus, in the distributed database system (or network application).

In further embodiments of the receiver apparatus, the receiver apparatus comprises a cryptography module, wherein the cryptography module comprises cryptographic data which are assigned to devices.

In further embodiments of the receiver apparatus, the cryptography module, by reference to the cryptographic data, checks and/or decrypts at least a proportion of data or a proportion of the message content of the corresponding first message for an assigned device wherein, for example, for the purposes of checking and/or decryption, the corresponding cryptographic data are loaded by reference to the assigned device.

The receiver apparatus is advantageous, in particular, for the checking of messages which are to be transmitted to a corresponding device. To this end, for example, the message originator can have received a first cryptographic key, by means of which, for example, a checksum (e.g. a transaction checksum or another of the above-mentioned checksums) with respect to data, messages or message content has been formed. Alternatively, by means of this first cryptographic key, for example, the message content or data, or a proportion of data, can have been encrypted. For example, by means of the first cryptographic key (in the event of a symmetric cryptography method), or a second cryptographic key which is assigned to the first cryptographic key (e.g. in an asymmetric cryptography method, in which e.g. the first key is a private key and the second key is a public key), decryption or checking of the corresponding message content or data can be executed.

Cryptographic data (e.g. the cryptographic keys), for example, can have been specifically generated for a device by reference to device-specific data (e.g. a UID of the device, a random number which has been generated by the corresponding device, or which has been calculated by reference to characteristic sensor data for the device—e.g. a calculated characteristic for a noise signal, which has been determined by a sensor of the device). Alternatively or additionally, cryptographic data are a combination of device-specific data and receiver apparatus-specific data (e.g. a UID of the receiver apparatus, a random number which has been generated by the receiver apparatus, or which has been calculated by reference to sensor data for the receiver apparatus—e.g. a calculated characteristic for a noise signal, which has been determined by a sensor of the receiver apparatus). For example, it is also possible that, by means of device-specific data and/or receiver apparatus-specific data for the corresponding device, cryptographic data are determined in a reproducible manner or, by means of these data, a cryptographic protection (e.g. an encryption), by means of which the corresponding cryptographic data of a device are protected, is removed (e.g. by decryption) and/or checked (e.g. by the checking of a digital signature). Device-specific data can be retrieved, for example, in conjunction with the retrieval of a device status of the device. Device-specific data and/or receiver apparatus-specific data are data which can only be forged with difficulty, e.g. a characteristic of a noise signal (which is detected e.g. by a sensor or a manipulation-proofing module) which, upon any manipulation of the device, are modified such that, in response to the resulting modification of the characteristic, cryptographic data are invalidated or can no longer be accessed. Device-specific data can also be determined or replaced by means of a challenge-response method wherein, for example, the method is configured on the device side and on the receiver apparatus side with corresponding initial values (e.g, wherein, in a protected memory of the device or the receiver apparatus, corresponding initial values are preconfigured, or these initial values are calculated and/or supplied by the protected memory), and corresponding device-specific data (e.g. a cryptographic key or an element of a cryptographic key) can be retrieved by the receiver apparatus.

In further embodiments of the receiver apparatus, the conversion module is designed, by reference to the device, to execute a check as to which data (e.g. which data elements and/or which element of data and/or all data) can be processed by the (assigned) device.

The result of this check is saved, for example, in the form of a conversion test result wherein, for example, the conversion test result indicates which elements of data, or whether the data per se, are to be converted for the assigned device. In other words, the conversion test result comprises e.g. device-specific conversion instructions for data, in order to permit the specific conversion of data for the assigned device, such that the assigned device e.g. can process the corresponding data (e.g. also including elements of data which are to be converted). In order to determine, for example, whether the execution of data by the assigned device is possible, this check can take account of device properties and/or current device properties and/or device information for the assigned device. Device information can also comprise, for example, the corresponding device properties (e.g. current device properties).

Data can be provided, for example, in a text format, XML format or JSON format, wherein it is possible, however, that the assigned device, depending upon its device properties, can (only) process a specific binary data format. This will be determined e.g. by checking, and the conversion test result, for example, will then include indications to the effect that, in order to be processed by the device, data will need to be converted and/or, for example, can additionally comprise instructions as to how data are to be converted. In these data, for example, data types can also be employed which are incompatible with the assigned device. These can include, for example, double data types, big integer data types or date formats which cannot be processed by the assigned device. Here again, e.g. a corresponding conversion can be executed, as indicated above for other examples.

The term incompatible signifies, for example, that corresponding data (i.e., for example, the data format or data formats of data) cannot be processed or are not supported (e.g. by the network application or the distributed database system). The term compatible signifies, for example, that corresponding data (i.e., for example, the data format or data formats of data) can be processed or are supported (e.g. by the network application or the distributed database system).

In the event that, for example, a check establishes that elements of data (e.g. an element of message content which is saved in these data) cannot be processed by the assigned device (i.e., for example, the corresponding data format is not compatible with the corresponding elements of data) and that further elements of data can be processed by the device, the conversion module, for example, converts only those data which cannot be processed by the device (or are incompatible). Converted elements of data, and those elements of data, the execution of which by the assigned device was possible, are then reconsolidated to form (converted) data (or a data record), which can then be processed as a whole e.g. by the assigned device. Correspondingly, these converted data (or a data record), are then transmitted to the assigned device.

This is advantageous, for example, in the event that the assigned device is only capable of processing, for example, date information up to a specific time point (e.g. 31.12.1999). In such a case, e.g. current date information (1.1.2018) is converted into a processable date (e.g. 1.1.1988). In this conversion, for example, incompatible data elements (e.g. data information which supersedes 31.12.1999), by means of a conversion specification in the device-specific conversion instructions (e.g. the current date—30 years), are converted into a compatible date format for the assigned device (e.g. 1.1.1988).

Upon the execution of a check, for example, it can also be established that specific elements of data are not convertible. This means, for example, that there is no option for the conversion of the corresponding data or data element into a data format which can be processed by the assigned device. In such a case, for example, transmission of such data to the assigned device can be suppressed and/or an error message can be transmitted to an administrator. Alternatively or additionally, corresponding data, or elements of data, can be occupied by standard values (e.g. an empty string, with a date in a valid format which, for example, is not the current date), such that e.g. at least other elements of data can be transmitted.

In further embodiments of the receiver apparatus, the receiver apparatus comprises an identification module. The identification module is particularly designed, by reference to data, to calculate an assignment (or the assignment) of those devices for which, for example, data have been determined. Alternatively or additionally, the identification module is particularly designed, for example, by reference to data, to calculate an assignment or the assignment by means of which, for example, the assigned device is determined.

In other words, for example, by reference to data, the identification module calculates (or establishes) which device is intended to process these data. Correspondingly, such a device, for example by means of assignment, e.g. in the form of an assignment data record, is assigned to these data. The assignment or assignment data record can comprise, for example, device information or device properties of the assigned device. This assignment or assignment data record can then be employed, for example by the conversion module, in order to execute a check, for example, as to which data (e.g. which proportion of data and/or all data) of the data concerned can be processed by the assigned device. In further embodiments of receiver apparatuses, each of the latter, for example, can additionally comprise a configuration interface and/or a ventilator and/or a monitoring module. By means of the configuration interface, for example, updates or firmware versions can be incorporated. By means of the ventilator, for example, the receiver apparatus can be cooled. By means of the monitoring module, the status and/or the operational performance of the corresponding receiver apparatus can be monitored and e.g. saved in a file (e.g. a logging file).

According to a further embodiment, embodiments of the invention comprise, alternatively or additionally to the receiver apparatus, at least one transmitter apparatus which, in turn, comprises two communication interfaces, an identification module and a conversion module.

The conversion module can be designed, for example, to convert data or message content from the corresponding first message into a data format for the distributed database system or for a network application, wherein the data format e.g. is dictated by the assigned device.

For example, the conversion module can be designed to select the (corresponding) distributed database system from the distributed database systems, or to select the (corresponding) network application from the network applications, by reference to the test result and/or data format requirements. For example, the second communication interface can be designed to transmit converted data and/or data to the selected (corresponding) distributed database system or the selected (corresponding) network application. In other words, for example, the network application is the selected network application, or the distributed database system is the selected distributed database system.

Data format requirements can be dictated, for example, by the assignment and/or by devices properties (of the assigned device) which are saved in the assignment (or in an assignment data record).

If, for example, a plurality of distributed database systems or a plurality of network applications fulfil the data format requirements—and are thus respectively compatible with data format requirements-data, e.g. for the respective compatible distributed database systems or for the respective compatible network applications, can be converted and/or respectively transmitted to the latter. The term compatible, for example, signifies that the respective distributed database system or the respective network application supports and/or can process at least one data format from the data format requirements. The data format, for example, indicates a format for data which can be processed by the network application or the distributed database system.

For example, alternatively or additionally, from the compatible distributed database systems or the compatible network applications, a network application or a distributed database system for data conversion (or for the conversion of data) and/or for data transmission (of converted data or data), can also be selected which fulfils an additional selection criterion. The selection criterion can stipulate, for example, reliability, cryptographic requirements (e.g. key lengths employed, cryptographic protocols) or requirements for the corresponding infrastructure (e.g. the necessity for the presence of at least a stipulated number of nodes, or for the embodiment of the network application or the distributed database system e.g. in the form of a cloud system) which are to be supported by the network application or the distributed database system. For example, only a distributed database system or a network application is selected which delivers the optimum fulfilment of the selection criterion.

For example, the second communication interface is designed to communicate with the distributed database systems (e.g. the distributed database system, or the further distributed database systems, or the selected distributed database system) or the network applications (e.g. the network application, the further network applications, or the selected network application), in order to permit the retrieval of supported data formats on the network applications or distributed database systems and/or the transmission of converted data.

Specific examples whereby e.g. data conversion can be executed, can be embodied in an analogous manner to examples of the receiver apparatus.

Data can thus comprise, for example, the first messages or first message, or the message content of the first message, or data on a communication link.

By means of embodiments of the invention, in particular, it is possible for a decentralized infrastructure to be coupled with old or legacy devices. By means of embodiments of the invention, in particular, coupling of such old devices to a new, blockchain-based infrastructure can be executed. This is advantageous, for example, for energy supply systems, the control of which can be converted to a blockchain infrastructure, without the necessity, however, for the replacement of each individual device in the existing energy supply system. Embodiments of the invention make it possible, for example, for a device to transmit messages (e.g. incorporating control commands or status messages for the processing of control commands) to the distributed database system or network application, wherein the transmitter apparatus is communicatively arranged between the devices and the distributed database system (or network application) and executes the assignment and/or transmission of the respective messages to the distributed database system (or network application). In particular, the corresponding message content or data are also converted into a data format which is compatible with the distributed database system (or network application). In particular, it is not necessary for devices to be adapted to the new infrastructure.

For example, device properties of the assigned device dictate that data can be saved in one or more data formats in the distributed database system or network application. For example, data format requirements can stipulate that data from the assigned device are to be saved in a XML format or a JSON format, but not in a binary format. For example, the distributed database system supports a XML format, whereas the network application supports only a proprietary binary format. The second communication interface and/or the conversion module firstly execute a check as to which data formats, which are supported by the distributed database system or network application (wherein the term supported signifies, for example, which data formats can be processed by the distributed database system or network application), also correspond to the data format stipulations of the data format requirements of the assigned device. According to one variant, for example, the communication interface then communicates, for example by reference to the test result which is determined by means of this check, to which distributed database system (a plurality of distributed database systems can also exist) or to which network application converted data are to be transmitted. This test result, alternatively, can also be determined by the conversion module or the identification module in the same manner, and delivered e.g. to the second communication interface.

For example, the second communication interface can be designed, according to the test result, to transmit converted data or the converted message content to the distributed database system or a further distributed database system, or to the network application or a further network application.

In further embodiments of the transmitter apparatus, the transmitter apparatus comprises a cryptography module, wherein the cryptography module comprises cryptographic data which are assigned to devices.

In further embodiments of the transmitter apparatus, the cryptography module, by reference to the assigned device, loads corresponding cryptographic data wherein, by means of the corresponding cryptographic data (which are device-specific), at least a proportion of data or a proportion of the message content of the corresponding first message are cryptographically protected in a device-specific manner for the assigned device and wherein, for example, cryptographic protection is executed prior to the transmission of message content or data (or of the converted variants of the above-mentioned data, messages and message content).

The transmitter apparatus is advantageous, particularly for the cryptographic protection of messages which are transmitted to the distributed database system (or to the network application) (and/or which are saved by the latter). This can be executed, for example, wherein the corresponding data or the corresponding message content are protected and/or encrypted by means of a (cryptographic) checksum (e.g. a transaction checksum). To this end, the transmitter apparatus can comprise, for example, a first cryptographic key (which e.g. is device-specific), by means of which, for example, a checksum with respect to data, messages or message content is generated. Alternatively, by means of this first cryptographic key, for example, message content can also be encrypted or data can also be encrypted. A recipient of the message, for example by means of the first cryptographic key (in the case of a symmetric cryptographic method) or by means of a second cryptographic key, which is assigned to the first cryptographic key (e.g. in an asymmetric encryption method wherein e.g. the first key is a private key and the second key is a public key), can execute the decryption or checking of the corresponding message content or the corresponding data. In this case, the corresponding key material can be delivered to the recipient, for example via a secure channel.

Cryptographic data (e.g. the cryptographic keys), for example, can have been specifically generated for a device by reference to device-specific data (e.g. a UID of the device, a random number which has been generated by the corresponding device, or which has been calculated by reference to characteristic sensor data for the device—e.g. a calculated characteristic for a noise signal, which has been determined by a sensor of the device). Alternatively or additionally, cryptographic data are a combination of device-specific data and transmitter apparatus-specific data (e.g. a UID of the transmitter apparatus, a random number which has been generated by the transmitter apparatus, or which has been calculated by reference to sensor data for the transmitter apparatus—e.g. a calculated characteristic for a noise signal, which has been determined by a sensor of the transmitter apparatus). For example, it is also possible that, by means of device-specific data and/or transmitter apparatus-specific data for the corresponding device, cryptographic data are determined in a reproducible manner. For example, by means of device-specific data and/or transmitter apparatus-specific data, a cryptographic protection (e.g. an encryption), by means of which the corresponding cryptographic data of a device are protected, is removed (e.g. by decryption) and/or checked (e.g. by the checking of a digital signature or the checking of a (cryptographic) checksum for cryptographic data), in the event that e.g. a separate cryptographic key for this purpose is inferred or calculated from device-specific data and/or transmitter apparatus-specific data. Device-specific data can be saved, for example, in the message for the corresponding device. Device-specific data and/or transmitter apparatus-specific data are data which can only be forged with difficulty, e.g. a characteristic of a noise signal (which is detected e.g. by a sensor or a manipulation-proofing module) which, upon any manipulation of the device, is modified such that, in response to the resulting modification of the characteristic, cryptographic data are invalidated or can no longer be accessed. Device-specific data can also be determined or replaced by means of a challenge-response method wherein, for example, the method is configured on the device side and on the transmitter apparatus side with corresponding initial values (e.g, wherein, in a protected memory of the device or the transmitter apparatus, corresponding initial values are preconfigured, or these initial values are calculated and/or supplied by the protected memory), and corresponding device-specific data (e.g. a cryptographic key or an element of a cryptographic key) can be retrieved by the transmitter apparatus.

In further embodiments of the transmitter apparatus and/or the receiver apparatus, the network application or the distributed database system is a blockchain wherein, for example, messages which are transmitted and/or received by the distributed database system (or network application) are transactions.

In further embodiments of the transmitter apparatus and/or the receiver apparatus, at least a proportion of devices are devices in an automation network.

In further embodiments of transmitter apparatuses, each of the latter, for example, can additionally comprise a configuration interface and/or a ventilator and/or a monitoring module. By means of the configuration interface, for example, updates or firmware versions can be incorporated. By means of the ventilator, for example, the receiver apparatus can be cooled. By means of the monitoring module, the status and/or the operational performance of the corresponding receiver apparatus can be monitored and e.g. saved in a file (e.g. a logging file).

In other embodiments, the system comprises a single cryptography module, wherein the cryptography module comprises cryptographic data which are assigned to devices. Advantageously, cryptographic data can thus be employed by both the receiver apparatus and the transmitter apparatus. Expenditure for the production and administration of multiple cryptography modules can be reduced accordingly. Susceptibility to faults is also reduced on the grounds that, by a reduction in the number of components, complexity is removed from the system.

According to a further aspect of embodiments of the invention, the system comprises an unambiguity confirmation module, which is designed only to permit the activity of the at least one receiver or transmitter apparatus in the event that no other system is active which executes the same coupling, particularly by way of conversion, as the system. Advantageously, this aspect permits the availability of coupling between old legacy devices and distributed database systems or network applications to be increased, wherein multiple systems are present, but with no simultaneous breach of characteristic unambiguity paradigms for distributed database systems or network applications on the grounds of the existence of two functionally equivalent systems, by which the same coupling is executed-particularly using identical cryptographic data or keys—and which, in the absence of embodiments of the invention would, by definition, result in the duplication of all data received and transmitted.

In a further embodiment, the unambiguity confirmation module is designed to check activity on the further system by means of a status synchronization channel, which is employed for the synchronization of at least an element of the status of the system and the further system. Thus, advantageously, by means of the same channel, at the same time 1) the synchronicity of systems is maintained, as a result of which the availability of coupling, which is of key significance in an industrial environment, can be substantially increased, if it is intended that a system should remain inactive, on the grounds that a substantially synchronous system exists, which can be activated in this case, and 2) it is ensured that both systems are not simultaneously active.

Particularly beneficial advantages are achieved, if the unambiguity confirmation module is designed to synchronize cryptographic data which are assigned to devices. In this case, particularly for distributed database systems or network applications, the independent detection of any breaches of characteristic unambiguity paradigms would scarcely be possible, on the grounds that the coupling of all participating systems is executed using valid keys-particularly valid private keys. This risk is neatly eliminated by unambiguity confirmation of activity on systems.

Unambiguity confirmation can be provided both unilaterally and reciprocally. Unilateral unambiguity confirmation permits the establishment of a functionally equivalent coupling, which itself comprises no unambiguity confirmation according to embodiments of the invention. Reciprocal coupling permits the interchange of roles between multiple systems having a functionally equivalent coupling, wherein unambiguity confirmation vis-à-vis the respectively active system is executed by the inactive system(s).

The unambiguity confirmation module can be designed to permit the activity of at least one receiver or transmitter apparatus, in the event that an error occurs upon synchronization. Advantageously, a particularly high availability of coupling can thus be achieved, which is of key significance, particularly in an industrial environment.

In one embodiment of the invention, the unambiguity confirmation module is configured in the form of a separate device or a separate computer program product (non-transitory computer readable storage medium having instructions, which when executed by a processor, perform actions), which is executed in a cloud. Advantageously, an element of the system can thus be produced and operated separately, as a result of which dependencies are reduced, and flexibility for the selection of development tools, platforms and runtime environments which are to be employed is increased.

According to a further exemplary embodiment, the unambiguity confirmation module can comprise a transmission control module, which is designed to check whether first messages or data which are transmitted by devices are successfully saved in the distributed database system in a predefined time period or in a given number of data blocks. The transmission control module can be provided as an alternative to, or in parallel with the status synchronization channel. In the event of parallel employment, the quality of unambiguity confirmation is enhanced if the inactivity of a further system is established by multiple criteria, and the system is only activated in the event that all criteria are fulfilled.

According to one variant of embodiment, the unambiguity confirmation module is designed to permit the activity of the at least one receiver or transmitter apparatus, in the event that saving is not executed in the predefined time period or number of data blocks. This is particularly advantageous if inactivity of the further system can only be determined indirectly, e.g. on the grounds that no direct status synchronization channel is provided, or the channel has failed.

According to a further aspect, embodiments of the invention relate to a method for the computer-assisted reception of messages or data.

In further embodiments of the method, the method comprises further process steps for the realization of functional features, or of further features of the receiver apparatus or embodiments thereof.

Moreover, a computer program product having program commands for the execution of the above-mentioned methods according to embodiments of the invention is provided wherein, by means of the computer program product, in each case, one of the methods according to embodiments of the invention, all the methods according to embodiments of the invention, or a combination of methods according to embodiments of the invention are executable.

Additionally, a variant of the computer program product is provided, having program commands for the configuration of a production device, for example a 3D printer, a computer system or a production machine which is appropriate for the production of processors and/or devices, wherein the production device is configured with program commands, such that the above-mentioned transmitter apparatus and/or receiver apparatus according to embodiments of the invention is produced.

Moreover, a provision apparatus for the saving and/or provision of the computer program product is provided. The provision apparatus is, for example, a data medium, which saves and/or provides the computer program product. Alternatively and/or additionally, the provision apparatus is, for example, a network service, a computer system, a server system, particularly a distributed computer system, a cloud-based computer system and/or a virtual computer system, which saves and/or provides the computer program product, in the form of a data stream.

This provision is executed, for example, as a download in the form of a program data block and/or command data block, in the form of a file, particularly a download file, or in the form of a data stream, particularly a download data stream, of the complete computer program product. However, this provision can also be executed, for example, in the form of a partial download, which is comprised of a number of parts and, in particular, is downloaded via a peer-to-peer network or provided in the form of a data stream. A computer program product of this type, for example, is imported to a system by the employment of the provision apparatus, in the form of the data medium, and executes program commands such that the method according to embodiments of the invention is executed on a computer, or the production device is configured such that is produces the transmitter apparatus and/or the receiver apparatus according to embodiments of the invention.

BRIEF DESCRIPTION

Figure 4:
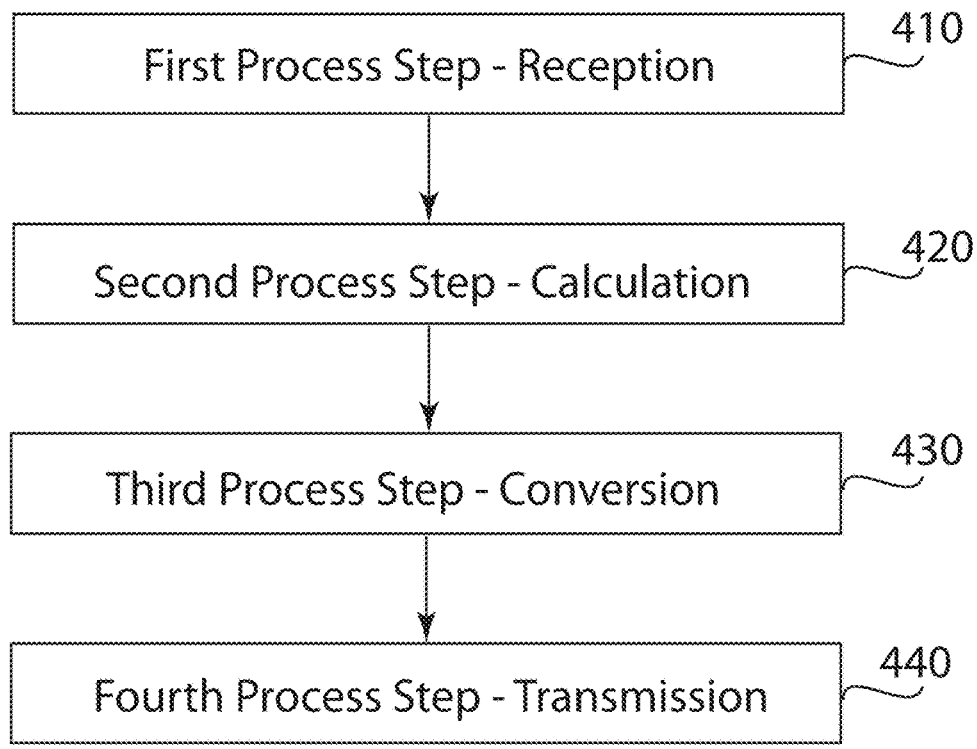
Figure 5:
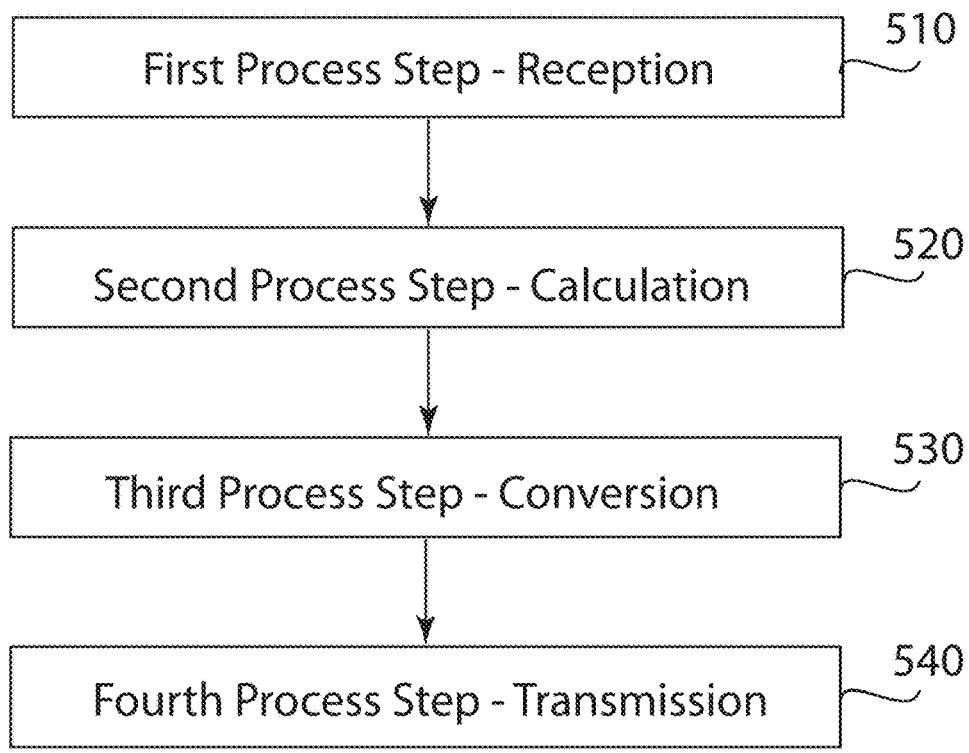

Some of the embodiments will be described in detail, with reference to the following figures, wherein like designations denote like members, wherein:

FIG. 1 shows a first exemplary embodiment;
FIG. 2 shows a further exemplary embodiment;
FIG. 3 shows a further exemplary embodiment;
FIG. 4 shows a further exemplary embodiment; and
FIG. 5 shows a further exemplary embodiment.

DETAILED DESCRIPTION

In the figures, functionally equivalent elements are identified by the same reference symbols, unless indicated otherwise.

The following exemplary embodiments, unless indicated otherwise or indicated previously, comprise at least one processor and/or one storage unit for the implementation or execution of the method.

Additionally, in particular, a (relevant) person skilled in the art, will evidently be aware of customary options according to the conventional art for the embodiment of products or options for implementation such that, in particular, no independent disclosure thereof is required in the description. In particular, these customary variants of embodiment, which will be familiar to a person skilled in the art, can be executed exclusively in the form of hardware (components) or exclusively in the form of software (components). Alternatively and/or additionally, a person skilled in the art, in the context of their specialized knowledge, can generally select arbitrary combinations, according to embodiments of the invention, of hardware (components) and software (components) for the implementation of variants of embodiment according to embodiments of the invention.

A combination according to embodiments of the invention of hardware (components) and software (components) can particularly occur, in the event that an element of actions according to embodiments of the invention are executed exclusively by means of special hardware (e.g. a processor in the form of an ASIC or FPGA) and/or that another element is executed by the (processor- and/or memory-supported) software.

In particular, in consideration of the large number of different options for embodiment, it is impossible, and likewise not expedient or necessary for the understanding of embodiments of the invention, for all of these options for embodiment to be specified. Accordingly, all of the following exemplary embodiments illustrate only a number of exemplary means whereby, in particular, such embodiments of the instruction according to embodiments of the invention might be realized.

Consequently, in particular, features of the individual exemplary embodiments are not limited to the respective exemplary embodiment, but refer in particular to embodiments of the invention in general. Correspondingly, the features of one exemplary embodiment can also be employed as features of another exemplary embodiment, particularly wherein there is no necessity for explicit reference to this effect to be included in the respective exemplary embodiment.

FIG. 1 shows a first exemplary embodiment of a system SYS and a further system WSYS, to which the same old devices or legacy devices D1, D2, D3 and a distributed database system in the form of a blockchain BC are coupled.

In this example, the system SYS comprises both a transmitter apparatus S and a receiver apparatus E, a cryptography module KR and an unambiguity confirmation module ES. The cryptography module KR in turn comprises cryptographic data KD which are assigned to devices.

Optionally, a status synchronization channel ZS is provided between the unambiguity confirmation module ES and the further system WSYS. Alternatively or in parallel hereto, in the present exemplary embodiment, the unambiguity confirmation module ES comprises a transmission control module SP, which is connected to the blockchain BC such that it can at least execute a check as to whether first messages or data transmitted by the devices D1, D2, D3 are successfully saved in the blockchain BC in a predefined period of time or number of data blocks.

Alternatively, the status synchronization channel ZS and the transmission control module SP can be assigned to different unambiguity confirmation modules ES.

FIG. 1 additionally shows an automation network AN having a first device D1, a second device D2 and a third device D3. The devices (D1, D2, D3) of the automation network (which can also be described as an automation system) are mutually communicatively connected by means of a second network NW2 (e.g. a communication network such as the Internet or an Ethernet system).

FIG. 1 moreover shows blocks B, for example a first block B1, a second block B2 and a third block B3 of a blockchain BC wherein, in this case, a section of the blockchain BC is specifically represented for exemplary purposes.

Each of the blocks B comprises a plurality of transactions T. The transactions T can comprise control transactions and/or confirmation transactions.

The first block B1 comprises, for example, a first transaction T1$a$, a second transaction T1$b$, a third transaction T1$c$ and a fourth transaction T1$d$.

The second block B2 comprises, for example, a fifth transaction T2$a$, a sixth transaction T2$b$, a seventh transaction T2$c$ and an eighth transaction T2$d$.

The third block B3 comprises, for example, a ninth transaction T3$a$, a tenth transaction T3$b$, an eleventh transaction T3$c$ and a twelfth transaction T3$d$.

Each of the blocks B further comprises a chained checksum CRC, the formation of which is dependent upon the immediate precursor block. The first block B1 thus comprises a first chained checksum CRC1 from its precursor block, the second block B2 comprises a second chained checksum CRC2 from the first block B1, and the third block B3 comprises a third chained checksum CRC3 from the second block B2.

The respective chained checksums CRC1, CRC2, CRC3 are formed by reference to the block header of the corresponding precursor block. The chained checksums CRC can be formed by the employment of a cryptographic hash function, such as e.g. SHA-256, KECCAK-256 or SHA-3. For example, the chained checksum can additionally be calculated by reference to the data block checksum, or the header comprises the data block checksum (the data block checksum is described hereinafter).

Additionally, each of the blocks can comprise a data block checksum. This can be embodied, for example, by means of a hash tree.

In order to form the hash tree, for each data (block) transaction, a transaction checksum (e.g. which is also a hash value) is calculated. Alternatively or additionally, a transaction checksum which has been generated by the originator of the transaction, in conjunction with the generation of the transaction, is re-employed for this purpose.

For a hash tree, e.g. a Merkle tree or Patricia tree is customarily employed, the root hash value/root checksum of which is saved as a corresponding data block checksum in the respective blocks.

In one variant, the data block checksum is employed as a chained checksum.

A block can further comprise a time stamp, a digital signature and a proof-of-work, as described with reference to the embodiments of the invention.

The blockchain BC itself is embodied by a blockchain infrastructure having a plurality of blockchain nodes BCN. The nodes can be, for example, a blockchain oracle or trusted node, or a system SYS. The nodes are mutually communicatively connected by means of a first network NW1 (e.g. a communication network such as the Internet or an Ethernet system). By means of the blockchain infrastructure, for example, at least a proportion of the data blocks B, or all the data blocks B in the blockchain BC are replicated for a proportion or all the nodes in the blockchain.

By means of the system SYS, the automation network AN is connected to a distributed database system or to a network application, wherein e.g. the network application e.g. comprises or embodies the distributed database system (e.g. a blockchain). To this end, the system SYS, in addition to the transmitter apparatus S and the receiver apparatus E, comprises a first communication interface NI1, which is connected to the first network NW1, and thus embodies a communication link with the distributed database system (or network application). The system SYS further comprises a second communication interface NI2, which is connected to the second network NW2, and thus embodies a communication link with the automation network AN.

The receiver apparatus E is communicatively connected via a first bus BE1 to the first communication interface NI1, and via a second bus BE2 to the second communication interface NI2.

The transmitter apparatus S is communicatively connected via a third bus BS1 to the second communication interface NI2, and via a fourth bus BS2 to the first communication interface NI1.

The system SYS, or the transmitter apparatus S and/or the receiver apparatus E, inhibit any direct communication between the automation network AN and the distributed database system (which is embodied e.g. in the form of a blockchain BC) or network application. This is advantageous, on the grounds that the automation network AN and the devices (D1, D2, D3) can comprise an old system, the operation of which might be disturbed, for example, if messages from the distributed database system (or network application) are transmitted directly to the automation network. Problems might occur, for example with respect to bandwidth, such that communication between the devices (D1-D3), e.g. on the grounds of a high network load (which is generated by messages on the distributed database system or network application), and the second network NW2 is restricted or impaired. Additionally, for example, operation of the devices can be impaired, on the grounds that devices receive messages in a data format which is not processible, or is not to be processed by the latter.

FIG. 2 and FIG. 3 illustrate the detailed operation of the transmitter apparatus S (FIG. 3) and the receiver apparatus E (FIG. 2).

Depending upon the relevant variants of implementation, the system SYS can comprise the transmitter apparatus S, the receiver apparatus E, or both.

In the event that the system SYS comprises the transmitter apparatus S (and thus excludes the receiver apparatus E), a system of this type advantageously permits, for example, (only) the transmission of messages from the devices. This can be the case, if the devices e.g. transmit status information or control commands, but are not intended/required to process information from the distributed database system (or network application).

In the event that the system SYS, for example, comprises a receiver apparatus E (and no transmitter apparatus S), this can be advantageous, if the devices (D1-D3), for example, are only intended to receive and process data, and not to send/transmit messages back to the distributed database system (or network application). In such a case, for example, information on the processing status of messages by the devices can be transmitted via another communication channel (e.g. by means of sensors, which are connected via a third communication network, or via the first communication network, to the distributed database system or network application).

The receiver apparatus E comprises a first communication interface 210 (e.g. a network interface to an Ethernet system), an identification module 220, a conversion module 230 and a second communication interface 240 (e.g. a network interface to an Ethernet system), which are mutually communicatively connected by means of a bus 201.

The receiver apparatus E is communicatively connected via a first bus BE1 to the first communication interface NI1 and is communicatively connected via a second bus BE2 to the second communication interface NI2.

The communication interfaces of the receiver apparatus or transmitter apparatus can also be described, for example, as communication modules or network interfaces.

The first communication interface 210 is designed to communicate with a distributed database system or network application and is connected to the first bus BE1. The first communication interface 210 is thus communicatively connected via the first bus BE1 to the first communication interface NI1 of the system SYS. Moreover, the first communication interface is designed to receive first messages (e.g. the first transaction T1a and/or further transactions of the first block) or data from the distributed database system (or network application). The first messages or data, for example, are saved in a data format (e.g. a XML format) of the distributed database system (or network application).

The identification module is designed, by reference to data or the respective message content of data, or the respective message content of first messages, to calculate an assignment of the devices for which a corresponding first message TE (e.g. if the first message is a message among the first messages) or the (corresponding) data is or are intended. For example, the (corresponding) data or corresponding message content can comprise a digital signature, a digital certificate, a device address (e.g. a network address), a specific technical function, an unambiguous identifier (e.g. a UID), or a combination hereof, by reference to which the device or devices can be determined. For example, data, the message or message content can comprise an indication to the effect that devices are intended to execute a specific technical task. The identification module 220 then identifies which devices are appropriate for the execution of this task. For example, the task can be the delivery by a reserve power plant, within a predefined time (e.g. 4 hours) and for a predefined time period (e.g. 24 hours), of a predefined capacity (e.g. 500 MW). The identification module 220 then identifies the devices which are required for the execution of such a task. For example, the first device D1 can be a gas turbine of capacity 200 MW, the second device can be a gas turbine of capacity 200 MW, and the third device can be a gas turbine of capacity 200 MW. If the automation network or devices are capable of executing this task, a corresponding confirmation message is sent to the distributed database system (or network application). If the automation network or devices are not capable of executing this task, a corresponding rejection message for the task is sent to the distributed database system (or network application).

Assignment can be embodied, for example, in the form of an assignment data record, which comprises e.g. corresponding information for the purposes of assignment. These can comprise, for example, a digital certificate of the device, a device address (e.g. a network address), an unambiguous identifier (e.g. a UID), or a combination hereof. The assignment or assignment data record can, for example, comprise further data. These data can be, for example, device properties for the indication e.g. of which constituent data (or data elements), e.g. of data or messages, or of a corresponding message content (e.g. the message content of the first message or the first message itself) can be processed by a corresponding device (i.e. by a device which is identified by assignment) and/or which data, or which data in the message and/or the message content needs to be converted for the device. The assignment can also comprise, for example, practical conversion instructions as to how data or the corresponding message content, or the corresponding message, are to be converted.

Thus, by means of assignment or the assignment data record, for example, (corresponding) data, or a corresponding message or corresponding message content can be assigned e.g. to a device which is capable of processing these data, this message, or the corresponding message content. A device of this type, which is assigned in this manner, can also be described as an assigned device.

The conversion module 230 is designed to convert data or the message content of the corresponding first message TE (e.g. in the event that the first message is a message among first messages) into a data format for the assigned device (e.g. the first device D1). In particular, old devices (or "legacy devices") are not capable of processing communication data on a distributed database system (or network application) or blockchain. Accordingly, by reference to the assigned device, a check is executed as to which data, or which data from the message content, the device is capable of processing whatsoever and/or, with reference to the assigned device, a check is also executed as to how these data can be converted for a corresponding device. For example, the above-mentioned technical task (actuation of a reserve power plant), which is saved in the message, is converted into specific control commands for the devices or generators. These control commands are determined in accordance with requirements for the task. For example, the first two devices or gas turbines are employed or operated at full capacity, and the third gas turbine is operated at only half-capacity, in order to deliver the requisite 500 MW of capacity. The data format is e.g. a proprietary data format of the devices.

The second communication interface 240 is designed to transmit converted message content to the device which is assigned to the corresponding first message. Accordingly, the second communication interface 240 is connected to the second bus BE2 and, via the latter, is communicatively connected to the second communication interface NI2 of the system SYS. Data or the corresponding message content, which are transmitted to the corresponding device or the corresponding devices, can be transmitted to the devices/the device e.g. in the form of a second message NE.

According to one variant, the conversion module 230, in particular, is an optional module. This is the case, for example, if data or the message content of the corresponding first message do not require conversion, or if the corresponding first message assumes a data format which can be processed by devices. In such a case, the converted message content (or converted data), upon the transmission thereof to the device or devices, corresponds to the (unconverted) message content of the corresponding first message (or unconverted data). In consequence, for example, the corresponding first message is transmitted to the device or the corresponding devices in the form of a second message. In consequence, particularly for other embodiments of the receiver apparatus, where applicable, the message content of the corresponding first message corresponds to the converted message content.

According to this variant, the receiver apparatus can comprise the following features:
for example, a first communication interface, wherein
  for example, the first network interface is designed to communicate with a distributed database system or network application,
  for example, the first communication interface is designed to receive data or first messages from the distributed database system or network application;
for example, an identification module, wherein
  or example, the identification module is designed, by reference to data or the respective message content of the first message, to calculate an assignment of the devices for which a corresponding message or data is/are intended;
for example, a second communication interface, wherein
  for example, the second communication interface is designed to transmit data, or converted data, or the converted message content and/or the message content of the corresponding first message (and/or the first message itself) to the device which is assigned to the corresponding first message.

According to one variant, the receiver apparatus retrieves a device status from a device which is assigned to a corresponding first message TE or data (e.g. device D1). Transmission to the assigned device is dependent upon the device status retrieved.

Additionally, for example, together with the device status, a data record with respect to available device resources and/or current device properties can also be retrieved.

Particularly in the case of old devices, it is appropriate that a check should be executed as to whether the devices have any capability whatsoever for the processing of the corresponding messages.

If, for example, the second turbine (second device), on the grounds of wear or a technical defect, currently has a reduced capacity, this can be considered, for example, in the identification of devices, and also in the conversion or generation of control commands for the start-up or actuation of gas turbines. Accordingly, for example, the first and third devices can be employed or operated at full capacity, and the second device correspondingly employed at half-capacity.

In other words, transmission to the corresponding device or devices is executed, provided that stipulated requirements of data or the corresponding first message TE are fulfilled by the assigned device wherein, for example, the fulfilment of predefined requirements is checked by reference to the device status. The technical task can thus be determined, for example, by the predefined requirements. Predefined requirements can be saved in a corresponding data record for the corresponding first message TE or data. Predefined requirements can include, for example, a requirement for the delivery of 500 MW for 24 hours on a predefined date (e.g. 9th July 2018 at 14:43) in a predefined location or region (e.g. Munich, or Bavaria, or Germany). Predefined requirements can include, for example, production instructions or production specifications, for example for the production of a gearbox or gearbox components, on a predefined date (e.g. 9th July 2018 at 14:43), in a predefined location or region (e.g. Munich, or Bavaria, or Germany), within a predefined time interval (commencing on a predefined date), and with a predefined accuracy (e.g. a maximum deviation of 1 mm from CAD data). Correspondingly, predefined requirements can comprise the above-mentioned examples or a combination of the above-mentioned examples.

Predefined requirements can also be, for example, stipulated control commands, or can comprise the latter. Predefined requirements dictate, for example, that stipulated control commands must previously have been executed, for example by one of the devices or a corresponding device, before data or the corresponding messages or message content (e.g. converted message content) are transmitted to the devices. Alternatively or additionally, stipulated control commands can also relate to further devices wherein, for example, the further devices are devices in a further automation network. It is required, for example that, by means of the further automation network (e.g. a fuel distribution network), at least a predefined quantity of fuel for generators has been delivered, before the corresponding messages containing control commands can be transmitted to devices (e.g. turbines or gas turbines). In order to confirm, for example, whether stipulated control commands have previously been executed, for example, corresponding messages or transactions in the distributed database system (or network application) can be scanned or checked which, for example, confirm the execution of stipulated control commands. These corresponding messages or transactions can be described, for example, as confirmation transactions, and are saved by the corresponding devices, for example further to an execution of stipulated control commands, e.g. by means of the transmitter apparatus S, in the distributed database system (or network application). These confirmation transactions can comprise, for example, information on the execution of stipulated control commands (e.g. the location, time and duration of execution of stipulated control commands), and device status information (e.g. whether the device was in a routine operating condition, or in a maintenance condition).

The above-mentioned control commands are also advantageous, in the event that the automation network AN and the devices comprise a production installation (e.g. the devices are production machines). For example, by means of stipulated control commands, it can also be confirmed that a workpiece which is to be produced is in a (production) state such that control commands which are contained in the (converted) message content to be transmitted, or in data to be transmitted, can be correctly executed for the further processing of the workpiece. For example, stipulated control commands can dictate that a workpiece is initially to be processed in a lathe (e.g. the first device D1), and is then delivered to a predefined station for further processing. The (current and converted) message content or the (current and converted) data, incorporating control commands which are to be transmitted, are defined, for example, for a polishing machine (e.g. the second device D2) (and are thus to be transmitted to the latter), which receives and polishes the corresponding workpiece at the predefined station.

The above-mentioned control commands are also advantageous in the event that the automation network AN and the devices comprise, for example, networked cash machines or automatic teller machines. For example, by means of stipulated control commands, it can also be confirmed that any payout of cash by an automatic teller machine (e.g. by the device D1) is executed on condition that, beforehand, authentication of the bank customer has been successfully completed, and confirmation to this effect has been saved in the corresponding confirmation transactions of the distributed database system (or network application).

For example, in the stipulated control commands (i.e. the predefined requirements), it is dictated that e.g. user authentication or user identification by means of a predefined authentication method (e.g. two-factor authentication, PIN entry) must be successfully completed before e.g. any payout of cash can be permitted or executed. The receiver apparatus E (e.g. by means of the second communication interface 240) will only transmit the corresponding (converted) data or the corresponding (converted) message content (of the corresponding first message), incorporating control commands, to the device (e.g. the automatic teller machine) in the event that e.g. a confirmation transaction is present in the distributed database system (or network application) which, for example, confirms a successful user authentication or user identification. By means of control commands, for example, the cash machine is then configured such the quantity of cash requested by the user or bank customer is delivered, and the gate which permits the removal of cash is then opened.

In particular, according to this variant, the transmitter apparatus S is also configured to transmit the corresponding messages or confirmation transactions, optionally for the stipulated control commands, to the distributed database system (or network application), or to execute the saving thereof in the distributed database system (or network application), in the event of the successful execution by devices of the corresponding stipulated control commands or control command. If, for example, this execution was not successful, this can also be saved in confirmation transactions or corresponding messages in the distributed database system (or network application).

According to one variant, the conversion module 230 e.g. is designed to convert data or the message content of the corresponding first message TE (e.g. in the event that the first message is a message among first messages) into a data format for the assigned device (e.g. the first device D1). In particular, old devices (or "legacy devices") are not capable of processing communication data on a network application, or a distributed database system or blockchain. Accordingly, by reference to the assigned device, a check is executed as to which data, or elements of data, or which data from the message content, the device (e.g. the assigned device) is capable of processing and/or, with reference to the assigned device, a check is also executed as to how these data can be converted for a corresponding device (e.g. the assigned device).

The conversion module is then designed, for example, to execute a check with respect to devices (e.g. by reference to the assignment which has been calculated e.g. for the determination of a corresponding device) as to how these data (e.g. the message content or message, or elements of data) are to be converted for the corresponding device (e.g. the assigned device.)

For example, the above-mentioned technical task (actuation of a reserve power plant), which is saved in data or in the message, can be converted into specific control commands for devices (e.g. the assigned device) or generators. These control commands are determined in accordance with requirements for the task. For example, the first two devices or gas turbines are employed or operated at full capacity, and the third gas turbine is operated at only half-capacity, in order to deliver the requisite 500 MW of capacity. The data format is e.g. a proprietary data format of the devices.

For the exemplary embodiments, embodiments or variants hereof described, for example, data can also be employed in lieu of first messages or the message content of the first message TE.

Data can be, for example, the first messages or first message, or the message content of the first message, or data on a communication link.

A number of further variants of the exemplary embodiment of the receiver apparatus are described hereinafter, wherein, in particular, variants of the conversion aspect are illustrated.

According to a further variant, the receiver apparatus can comprise the following features:
for example, a first communication interface, wherein
for example, the first network interface is designed to communicate with a distributed database system (or network application),
for example, the first communication interface is designed to receive data or first messages from the distributed database system (or network application);
for example, an identification module, wherein
for example, the identification module is designed, by reference to data or the respective message content of the first message, to calculate an assignment e.g. for the determination of devices for which a corresponding first message is intended;
for example, a conversion module, wherein
for example, the conversion module is designed to convert data or message content of the corresponding first message TE into a data format for a device (e.g. a device which has been determined by assignment, such as e.g. a legacy device or one of the devices D1-D3),
for example, the conversion module is designed, by reference to the device (e.g. by reference to the corresponding assignment for a corresponding device), to execute a check as to which data (or data elements) e.g. of the data or message content can be processed by the device;
for example, the conversion module is designed to execute a check for devices (e.g. by reference to the assignment which has been calculated e.g. for the determination of a corresponding device) as to how these data (e.g. the message content or message) or elements of data are to be converted for the corresponding device (e.g. the assigned device);
for example, a second communication interface, wherein
for example, the second communication interface is designed to transmit data, or converted data, or the converted message content and/or the message content of the corresponding first message (and/or the first message itself) to the device which is assigned to the corresponding first message.

According to a further variant, the receiver apparatus can comprise the following features:
for example, a first communication interface, wherein
for example, the first network interface is designed to communicate with a distributed database system (or network application),
for example, the first communication interface is designed to receive data or first messages from the distributed database system (or network application);
for example, a conversion module, wherein
for example, the conversion module is designed to convert data or message content of the corresponding first message TE into a data format for a device (e.g. an assigned device such as e.g. a legacy device or one of the devices D1-D3, or e.g. a device which has been determined by assignment, such as e.g. a legacy device or one of the devices D1-D3),
for example, the conversion module is designed, by reference to the device, to execute a check as to which data (or data elements) e.g. of the data or message content can be processed by the device;
for example, the conversion module is designed to execute a check for the device (e.g. the assigned device) as to how these data (or data elements) are to be converted for the corresponding device (e.g. the assigned device);
for example, a second communication interface, wherein
for example, the second communication interface is designed to transmit the converted message content and/or the message content of the corresponding first message (and/or the first message itself) to the device which is assigned to the corresponding first message.

According to a further variant, the receiver apparatus can comprise the following features:
for example, a first communication interface, wherein
for example, the first communication interface is designed to receive data or first messages from the distributed database system (or network application);
for example, a conversion module, wherein
for example, the conversion module is designed to convert data or message content of the corresponding first message TE into a data format for a device (e.g. an assigned device such as e.g. a legacy device or one of the devices D1-D3, or e.g. a device which has been determined by assignment, such as e.g. a legacy device or one of the devices D1-D3), for example, the conversion module is designed, by reference to the device, to execute a check as to which data (or data elements) e.g. of the data or message content can be processed by the device;

for example, the conversion module is designed to execute a check for the device (e.g. the assigned device) as to how these data (or data elements) are to be converted for the corresponding device (e.g. the assigned device);

for example, a second communication interface, wherein for example, the second communication interface is designed to transmit data and/or converted data and/or the converted message content and/or the message content of the corresponding first message (and/or the first message itself) to the device which is assigned to the corresponding first message.

According to a further variant, the receiver apparatus can comprise the following features:

for example, a first communication interface, wherein for example, the first communication interface is designed to receive data or first messages from the distributed database system (or network application);

for example, a conversion module, wherein for example, the conversion module is designed to convert data or message content of the corresponding first message TE (in the event that e.g. the first message is a message among first messages) into a data format for a device (e.g. an assigned device such as e.g. a legacy device or one of the devices D1-D3, or e.g. a device which has been determined by assignment, such as e.g. a legacy device or one of the devices D1-D3), for example, the conversion module is designed, by reference to the device, to execute a check as to which data (or data elements) e.g. of the data or message content can be processed by the device;

for example, the conversion module is designed to execute a check for the device (e.g. the assigned device) as to how these data (or data elements) are to be converted for the corresponding device (e.g. the assigned device);

for example, a second communication interface, wherein for example, the second communication interface is designed to transmit data and/or converted data and/or the converted message content and/or the message content of the corresponding first message (and/or the first message itself) to the device which is assigned to the corresponding first message.

The device for which message content of the first message TE and/or the first message TE is converted can be, for example, the assigned device by reference to which data or the message content and/or the first message TE are converted. This device can be controlled e.g. by reference to the assignment and/or the assignment data record, wherein e.g. the assignment and/or the assignment data record comprises corresponding information or instructions for conversion.

According to a further variant, for example, the receiver apparatus can comprise the following features:

for example, a first communication interface, wherein for example, the first communication interface is designed to receive data or first messages from the distributed database system (or network application);

for example, a conversion module, wherein for example, the conversion module is designed to convert data or message content of the corresponding first message TE (in the event that e.g. the first message is a message among first messages) into a data format, for example, conversion is executed into a data format of a device (e.g. an assigned device such as e.g. a legacy device or one of the devices D1-D3, or e.g. a device which has been determined by assignment, such as e.g. a legacy device or one of the devices D1-D3), for example, the device is assigned by means of a/the assignment of data or message content of the corresponding first message TE or the first message TE, for example, the conversion module is designed, by reference to the device, to execute a check as to which data (or data elements) e.g. of the data or message content can be processed by the device;

for example, the conversion module is designed to execute a check for the device (e.g. the assigned device) as to how these data (or data elements) are to be converted for the corresponding device (e.g. the assigned device);

for example, a second communication interface, wherein for example, the second communication interface is designed to transmit data and/or converted data and/or the converted message content and/or the message content of the corresponding first message (and/or the first message itself) to the device which is assigned to the corresponding first message.

The terms data elements, or element of data, or elements of data are to be understood, for example, as a data area (e.g. an address area or a memory area) and/or data types, wherein data, for example, are binary data and/or text-based data (e.g. XML data or JSON, or ASCII data), which assume a specific data format. Binary data e.g. are data in a binary data file, and text-based data, for example, are data in a text file.

For example, the receiver apparatus can also comprise an identification module, as described in the different variants and exemplary embodiments of the receiver apparatus.

The receiver apparatus, for example, in lieu of the message content of the first message TE, can also convert the first message TE itself or data (e.g. first messages) on a communication link and/or execute the assignment thereof to a device and/or execute the transmission thereof to the assigned device.

The first communication interface is designed e.g. to communicate with a distributed database system (or network application). For example, the first communication interface is designed to receive data or first messages from the distributed database system (or network application) and/or to communicate with the distributed database system (or network application) via a communication link, and e.g. to exchange data with the distributed database system (or network application).

For example, the identification module is designed, by reference to data or the respective message content of the first message, or the first message, or a message TE of the first messages, or data on the communication link, to determine e.g. for which devices these data, or a corresponding first message TE, or first messages, or the message content of a message (or messages), or data on a communication link are intended. In other words, the identification module assigns e.g. data (e.g. the respective message content of the first message or first messages, or the first message TE of the first messages, or data on the communication link, or message content) to a corresponding device.

For example, the conversion module is designed to convert data or the message content of the corresponding first message TE or the first messages, or the first message, or data on the communication link into a data format for a device (e.g. a device which is determined by assignment such as, e.g. a legacy device or one of the devices D1-D3).

For example, the conversion module is designed, by reference to the device (e.g. by reference to the corresponding assignment for a corresponding device or the assigned device), to execute a check as to which data e.g. of the message content, or data on the communication link, or messages, or the first message can be processed by the device.

For example, the conversion module is designed to execute a check for devices (e.g. by reference to the assignment which has been calculated e.g. for the determination of a corresponding device) as to how these data (e.g. the message content or message) are to be converted for the corresponding device (e.g. the assigned device).

For example, the second communication interface is designed to transmit converted data to the device which is assigned to the corresponding data.

The converted data are, optionally, the respective converted message content of first messages, or the converted first messages, or the converted first message TE of the first messages, or converted data on the communication link.

For example, in lieu of a distributed database system in the exemplary embodiments and variants, a network application (also described as a system application) can also be employed.

According to a further variant, for example, the receiver apparatus can comprise the following features:
for example, a first communication interface, wherein
  for example, the first communication interface is designed to receive data from a network application;
for example, a conversion module, wherein
  for example, the conversion module is designed to convert data into a data format,
  for example, conversion is executed into a data format of a device (e.g. an assigned device such as e.g. a legacy device or one of the devices D1-D3, or e.g. a device which has been determined by assignment, such as e.g. a legacy device or one of the devices D1-D3),
  for example, the device is assigned by means of a/the assignment of data,
  for example, the conversion module is designed, by reference to the device, to execute a check as to which data (e.g. which element of data or data elements) e.g. of the data can be processed by the device;
  for example, the conversion module is designed to execute a check for the device (e.g. the assigned device) as to how these data (e.g. the corresponding element of data) are to be converted for the corresponding device (e.g. the assigned device);
for example, a second communication interface, wherein
  for example, the second communication interface is designed to transmit data to the device to which said data or data elements are assigned.

The receiver apparatus, for example, can comprise an identification module wherein, for example, the identification module is designed to calculate an assignment by reference to data, in order e.g. to determine those devices for which data are intended.

According to a further variant of the exemplary embodiment, the receiver apparatus comprises, for example, a first communication interface 210 wherein, for example, the first communication interface is designed to receive data from a network application.

The receiver apparatus further comprises, for example, a conversion module wherein, for example, the conversion module is designed to convert data into a data format for a device which is assigned to said data. Moreover, for example, the conversion module is designed to determine, for the (assigned) device, whether and/or how these data are to be converted for the corresponding (assigned) device (e.g. the assigned device).

Moreover, the receiver apparatus comprises, for example, a second communication interface (240) wherein, for example, the second communication interface is designed to transmit converted data and/or data to the device which is assigned to said data.

According to a further variant of the exemplary embodiment, the receiver apparatus comprises, for example, a first communication interface wherein, for example, the first communication interface is designed to receive data from a network application.

The receiver apparatus further comprises, for example, a conversion module wherein, for example, the conversion module is designed to determine a conversion test result for data. The conversion test result indicates e.g. whether and/or how data, for example, are to be converted into a data format for the device which is assigned to said data. Determination of the conversion test result is executed in a device-specific manner for a device which is assigned to data (or for the device which is assigned to devices), in order e.g. to establish whether the assigned device has any capability whatsoever for the processing of the corresponding data (or elements of data) and/or, if necessary, whether data or elements of data specifically require conversion for the assigned device.

Thus, for example for those data to which e.g. the device is assigned, the conversion test result can be determined in a device-specific manner (e.g. for the assigned device). In other words, the conversion module e.g. is designed to determine the conversion test result for data, wherein e.g. the conversion test result is determined in accordance with the assigned device. For the determination of the test result, for example, a check is executed as to whether the assigned device has any capability (whatsoever) for the processing of data and/or, by reference to the assigned device, a check is executed as to how these data are converted for a corresponding device, such that the assigned device e.g. can process these data. The conversion test result then indicates e.g. whether and/or how data, for example, are to be converted into a data format for the device which is assigned to said data.

Moreover, the conversion module e.g. is designed to convert data into a data format for the device which is assigned to said data, according to the conversion test result.

The receiver apparatus moreover comprises, for example, a second communication interface wherein, for example, the second communication interface is designed to transmit converted data and/or data to the device to which data are assigned.

According to further variants of the receiver apparatus, the conversion module is designed, by reference to the device, to execute a check as to which data (e.g. which element of data and/or all data) among said data can be processed by the (assigned) device.

The result of this check is saved, for example, in the form of a conversion test result wherein, for example, the conversion test result indicates which elements of data, or whether the data per se, are to be converted for the assigned device. In other words, the conversion test result comprises e.g. device-specific conversion instructions for data, in order to permit the specific conversion of data for the assigned device, such that the assigned device e.g. can process the corresponding data (e.g. also including elements of data which are to be converted). In order to determine, for example, whether the execution and/or processing of data by the assigned device is possible, this check can take account of device properties and/or current device properties and/or device information for the assigned device. Device information can also comprise, for example, the corresponding device properties (e.g. current device properties).

Data can be provided, for example, in a text format, XML format or JSON format, wherein it is possible, however, that the assigned device, depending upon its device properties, can (only) process a specific binary data format. This will be determined e.g. by checking, and the conversion test result, for example, will then include indications to the effect that, in order to be processed by the device, data will need to be converted and/or, for example, can additionally comprise instructions as to how data are to be converted. In these data, for example, data types can also be employed which are incompatible with the assigned device. These can include, for example, double data types, big integer data types or date formats which cannot be processed by the assigned device. Here again, e.g. a corresponding conversion can be executed, as indicated above for other examples.

If, for example, it is established by checking that elements of data (e.g. an element of message content which is saved in data) cannot be processed by the assigned device (i.e., for example, the corresponding data format is not compatible with the corresponding elements of data), and that further elements of data can be processed by the device, the conversion module, for example, converts only those data which cannot be processed by the device (or are incompatible). Converted elements of data, and those elements of data, the execution of which by the assigned device was possible, are then reconsolidated to form (converted) data (or a data record), which can then be processed as a whole e.g. by the assigned device. Correspondingly, these converted data (or a data record), are then transmitted to the assigned device.

This is advantageous, for example, in the event that the assigned device is only capable of processing, for example, date information up to a specific time point (e.g. 31.12.1999). In such a case, e.g. current date information (1.1.2018) is converted into a processible date (e.g. 1.1.1988). In this conversion, for example, incompatible data elements (e.g. data information which supersedes 31.12.1999), by means of a conversion specification in the device-specific conversion instructions (e.g. the current date—30 years), are converted into a compatible date format for the assigned device (e.g. 1.1.1988).

Upon the execution of a check, for example, it can also be established that specific elements of data are not convertible. This means, for example, that there is no option for the conversion of the corresponding data or data element into a data format which can be processed by the assigned device. In such a case, for example, transmission of such data to the assigned device can be suppressed and/or an error message can be transmitted to an administrator. Alternatively or additionally, corresponding data, or elements of data, can be occupied by standard values (e.g. an empty string, with a date in a valid format which, for example, is not the current date), such that e.g. at least other elements of data can be transmitted.

In further variants of the receiver apparatus, the receiver apparatus comprises an identification module (if not already present), wherein the identification module is particularly designed, by reference to data, to calculate an assignment of those devices for which, for example, data have been determined, and wherein the identification module is particularly designed, for example, by reference to data, to calculate an assignment or the assignment by means of which, for example, the assigned device is determined.

In other words, for example, by reference to data, the identification module calculates (or establishes) which device is intended to process these data. Correspondingly, such a device, for example by means of assignment, e.g. in the form of an assignment data record, is assigned to these data. The assignment or assignment data record can comprise, for example, device information or device properties of the assigned device. This assignment or assignment data record can then be employed, for example by the conversion module, in order to execute a check, for example, as to which data (e.g. which proportion of data and/or all data) of the data concerned can be processed by the assigned device.

In further embodiments of receiver apparatuses, each of the latter, for example, can additionally comprise a configuration interface and/or a ventilator and/or a monitoring module. By means of the configuration interface, for example, updates or firmware versions can be incorporated. By means of the ventilator, for example, the receiver apparatus can be cooled. By means of the monitoring module, the status and/or the operational performance of the corresponding receiver apparatus can be monitored and e.g. saved in a file (e.g. a logging file).

The transmitter apparatus S comprises a first communication interface 310 (e.g. a network interface with an Ethernet system), an identification module 320, a conversion module 330 and a second communication interface (e.g. a network interface with an Ethernet system) 340, which are mutually communicatively connected by means of a bus 301.

The first communication interface 310 is designed to communicate with devices. The first communication interface 310 is connected to the third bus BS1, and is thus communicatively connected with the second communication interface NI2 of the system SYS. The first communication interface is further designed to receive first messages or data from devices. Data or first messages are saved e.g. in a proprietary data format of the devices.

The identification means 320 is designed, by reference to data or the respective message content of first messages, to calculate an assignment of the device which has sent the corresponding first message NS or data.

For example, data or corresponding message content can comprise a digital signal, a digital certificate, a device address (e.g. a network address), a device status (e.g. a device state) or an unambiguous identifier (e.g. a UID), by reference to which the corresponding device or devices can be identified. For example, data, the message or message content can comprise a device status, indicating the degree to which the technical task has been fulfilled by devices or the automation network.

Returning to the above-mentioned example of gas turbines: it might be the case e.g. that the devices, in total, do not deliver the requisite capacity. For example, the capacity delivered can total only 300 MW. Additionally, in each case, it is possible for individual messages to have been sent by devices indicating, for example, the degree or extent to which each has fulfilled the technical task (e.g. 50 MW of capacity delivered by the first device, 100 MW by the second device and 150 MW by the third device). The transmitter apparatus S or a further device (e.g. the device which has sent the message to the transmitter apparatus S) of the automation network AN then calculates the extent to which the technical task has been fulfilled.

The capacity shortfall, for example, can be relayed in the form of a message via the distributed database system (or network application) to a further automation network of a coal-fired power plant or wind power installation in the form of a second message TS. These installations, for example, can then deliver the shortfall in power generation capacity. The second message TS, for example, is then saved in transactions (e.g. the twelfth transaction T3$d$) of the distributed database system (or network application), or the second message (e.g. the twelfth transaction) is a transaction which has previously been saved in the distributed database system (or network application), further to the successful sending or transmission thereof.

The conversion module 330 is designed to convert data or the message content of the corresponding first message NS into a data format for the distributed database system (or network application). For example, data or message content of the corresponding first message can be converted into a generally applicable data format (e.g. XML or a corresponding XML data schema) which is compatible with the distributed database system (or network application) or a data format which can be processed by the distributed database system (or network application).

According to one variant the conversion module 330, in particular, is an optional module. This is the case, for example, if data or the message content of the corresponding first message do not require conversion, or if the corresponding first message assumes a data format which can be processed by the distributed database system (or network application). In such a case, the converted message content (or converted data), upon the transmission thereof to the network application or distributed database system, corresponds to the (unconverted) message content of the corresponding first message. In consequence, for example, the corresponding first message is transmitted to the distributed database system (or network application) in the form of a second message or, in an analogous manner, unconverted data are transmitted to the distributed database system or network application. In consequence, particularly for corresponding embodiments of the transmitter apparatus, where applicable, the message content of the corresponding first message corresponds to the converted message content.

According to this variant, the transmitter apparatus can comprise the following features:
for example, a first communication interface, wherein
for example, the first network interface is designed to communicate with devices,
for example, the communication interface is designed to receive first messages or data from devices;
for example, an identification module, wherein
for example, the identification module is designed, by reference to data or the respective message content of the first message, to calculate an assignment of the device which has sent a corresponding first message;
for example, a second communication interface, wherein
for example, the second communication interface is designed to communicate with a distributed database system (or network application),
for example, the second communication interface is designed to transmit data, or converted data, or the converted message content and/or the message content of the corresponding first message (and/or the first message itself) to the distributed database system (or network application).

The second communication interface 340 is designed to transmit converted message content or converted data to the distributed database system (or network application). Accordingly, the second communication interface 340 is connected to the fourth bus BS2 and, via the latter, is communicatively connected to the second communication interface NI2 of the system SYS. The (corresponding) data or corresponding message content which are transmitted to the distributed database system (or network application) can be transmitted to the devices/device e.g. in the form of a second message TE. The second message TE can be, for example, a transaction on the distributed database system (or network application), wherein the second message comprises/saves the converted message content or converted data.

According to different variants, the transmitter apparatus S and the receiver apparatus E can each comprise a stand-alone cryptography module. This is advantageous for the enhancement of security. In the event that, for example, any party obtains unauthorized access to cryptographic data on one of the cryptography modules, this unauthorized party will not automatically obtain access to other cryptographic data on the other cryptography module. Alternatively, the transmitter apparatus S and the receiver apparatus E can employ a common cryptography module. This advantageously permits the restriction of production costs for the individual modules. In the case of a common cryptography module, corresponding cryptographic data can be commonly employed by the transmitter apparatus S and/or the receiver apparatus E.

The cryptography module is protected against unauthorized access by a manipulation-proofing module (e.g. employing tamper mechanisms/manipulation-proofing mechanisms). For example, the cryptography module can comprise a mechanical and/or an electrical and/or an electronic and/or an electro-mechanical protective device. This can be embodied wherein, for example, the cryptography module saves cryptographic data for devices in a protected memory module or memory (e.g. a key memory), which data can (only) be accessed by the cryptography module. Accordingly, this memory and/or the cryptography module are protected by a steel housing (mechanical protective device), which prevents e.g. any access by unauthorized persons. Alternatively or additionally, the cryptography module or memory can be protected by a drill protection film. Immediately anyone attempts to access the memory in an unauthorized manner, or via an unauthorized interface, e.g. cryptographic data are deleted.

The cryptography module comprises, for example, cryptographic data which are specific to devices (device-specific cryptographic data).

Cryptographic data can comprise, for example, one or more cryptographic keys, which have been specifically calculated for a respective device. Cryptographic keys can be e.g. symmetric cryptographic keys or asymmetric cryptographic keys (e.g. a public/private key pair).

These cryptographic data can, for example, be permanently saved in, or by means of the cryptography module.

Alternatively, cryptographic data, upon the expiry of a predefined time period (e.g. in the event that a corresponding device has communicated no data/messages for a number of hours), can be deleted from the cryptography module. If the corresponding device resumes communication at a later time, the requisite cryptographic data can be recalculated. Correspondingly, cryptographic data can be calculated in a reproducible manner for a respective device, or recalculated. To this end, for example, unambiguous device-specific data for the corresponding device can be employed. Unambiguous device-specific data include, for example, a UID for the device—an unambiguous identifier which has been calculated by reference to characteristic sensor data for the device—e.g. a calculated characteristic for a noise signal, which has been determined by a sensor of the device. These unambiguous device-specific data can be employed, for example, in combination with a secret starting value (e.g. a seed) which, for example, is securely saved or administered by the cryptography module, in order to recalculate the corresponding cryptographic data. For example, a first secret starting value can be employed in order to calculate cryptographic data for the transmitter apparatus, and a second secret starting value can be employed to calculate cryptographic data for the receiver apparatus. The above-mentioned calculations are executed by the cryptography module such that e.g. the algorithms employed and temporarily calculated data are also protected against access by unauthorized parties.

The cryptography module, for example by reference to the assigned device, can then load, calculate or access the corresponding cryptographic data.

Loading of cryptographic data, for example, can also be executed wherein, by means of device-specific data and/or using device-specific data (e.g. transmitter apparatus-specific data and/or receiver apparatus-specific data), firstly, a further cryptographic key is generated, for example in order to permit access to device-specific cryptographic data for a corresponding device. (Device-specific) cryptographic data—as mentioned above—are saved by, or in the cryptography module. For example, a UID of a corresponding device is combined with a secret starting value of the transmitter apparatus S and/or the receiver apparatus E and/or the system SYS to form the further cryptographic key, for example for the decryption of cryptographic data. For the formation of the further cryptographic key, data can be consolidated e.g. in a combined character string (UID+ secret starting value). Alternatively or additionally, the combined character string or an element of the combined character string can be employed as an input parameter for a key derivation function, wherein a corresponding key can be reproducibly derived, provided that e.g. a substantively equivalent/identical character string is employed as an input parameter.

In the case of the transmitter apparatus S, for example by means of the corresponding cryptographic data, at least a proportion of data or the message content of the corresponding first message can be cryptographically protected in a device-specific manner for the assigned device (thereby generating e.g. device-specific cryptographic protection). This cryptographic protection is executed, for example, prior to the transmission of message content or data. In the case of a receiver apparatus E, by reference to cryptographic data, at least a proportion of data or the message content of the corresponding first message for an assigned device is checked and/or decrypted. For example, by the term device-specific cryptographic protection, it is to be understood that e.g. data or messages (or the message content thereof), which originate from a corresponding device, are protected by means of device-specific cryptographic data, in order to permit the verifiability of the authenticity of the corresponding data or the corresponding messages or message content.

In the case of the transmitter apparatus S, this is advantageous, particularly for the cryptographic protection of messages which are transmitted to the distributed data system (or network application) (or for the cryptographic checking of messages which have been sent by devices, e.g. in an analogous manner to the receiver apparatus). This can be executed, for example, wherein corresponding data or the corresponding message content are protected and/or encrypted by means of a (cryptographic) checksum. To this end, for example, the transmitter apparatus S can comprise a first cryptographic key (which is e.g. specific to the device), by means of which, for example, a checksum is formed with respect to data, messages or message content. Alternatively, by means of this first cryptographic key, for example, message content or data can also be encrypted. A recipient of the message or data, for example by means of the first cryptographic key (in the case of a symmetric cryptographic method) or a second cryptographic key, which is assigned to the first cryptographic key (e.g. in an asymmetric cryptographic method wherein, e.g. the first key is a private key and the second key is a public key), can execute the decryption or checking of the corresponding message content or data. To this end, the corresponding key material can have been delivered to the recipient, for example via a secure channel.

Cryptographic data (e.g. the cryptographic keys), e.g. for the transmitter apparatus S, for example, can have been specifically generated by reference to device-specific data or unambiguous device-specific data (e.g. a UID of the device, a random number which has been generated by the corresponding device, or which has been calculated by reference to characteristic sensor data for the device—e.g. a calculated characteristic for a noise signal, which has been determined by a sensor of the device). Alternatively or additionally, cryptographic data are a combination of (unambiguous) device-specific data and transmitter apparatus-specific data (e.g. a UID of the transmitter apparatus, a random number which has been generated by the transmitter apparatus, or which has been calculated by reference to sensor data for the transmitter apparatus—e.g. a calculated characteristic for a noise signal, which has been determined by a sensor of the transmitter apparatus).

Sensor data can be, for example, detected by a sensor, which detects e.g. thermal noise on a circuit of the device, or which employs the noise of the sensor itself. For example, noise on an unused data interface or on a used data interface can also be employed. This can be, for example (e.g. for devices or for the system SYS) a token ring network interface of a device, or a RS232 interface. Additionally, noise e.g. from a data acquisition hardware can be employed.

For example, for the transmitter apparatus S, it is also possible that, by means of device-specific data and/or transmitter apparatus-specific data (e.g. the secret starting value) for the corresponding device, cryptographic data are determined in a reproducible manner or, by means of these data, a cryptographic protection (e.g. an encryption), by means of which the corresponding cryptographic data of a device are protected, is removed (e.g. by decryption) and/or checked (e.g. by the checking of a digital signature). Device-specific data can be saved, for example, in the message of the corresponding device. Device-specific data and/or transmitter apparatus-specific data are data which can only be forged with difficulty, e.g. a characteristic of a noise signal (which is detected e.g. by a sensor or a manipulation-proofing module). Upon any manipulation of the device or apparatus (e.g. the transmitter apparatus or receiver apparatus), these device-specific data and/or (transmitter) apparatus-specific data would be modified such that, e.g. in response to the resulting modification of the characteristic, cryptographic data are invalidated or can no longer be accessed.

It is also possible, for example by means of a challenge-response method, for cryptographic data or key material, or device-specific data, or unambiguous device-specific data for a corresponding device to be replaced. This can be executed, for example, wherein the method is configured on the device side and on the transmitter apparatus side with corresponding initial values (e.g, wherein, in a protected memory of the device or the transmitter apparatus, corresponding initial values are preconfigured, or these initial values are calculated and/or supplied by the protected memory), and/or corresponding device-specific data (e.g. a cryptographic key or an element of a cryptographic key) can be retrieved by the transmitter apparatus.

The receiver apparatus E with a cryptography module is advantageous, in particular, for the cryptographic checking of messages which are to be transmitted to a corresponding device (or additionally, e.g. in an analogous manner to the transmitter device, for the cryptographic protection thereof). To this end, for example, the message originator can have received a first cryptographic key, by means of which, for example, a checksum with respect to messages, message content or data which have been received by the receiver apparatus E has been formed. Alternatively, by means of this first cryptographic key, for example, message content or data can also have been encrypted. For example, by means of the first cryptographic key (in the event of a symmetric cryptography method), or a second cryptographic key which is assigned to the first cryptographic key (e.g. in an asymmetric cryptography method, in which e.g. the first key is a private key and the second key is a public key), decryption or checking of the corresponding message content or data can be executed.

Cryptographic data (e.g. the cryptographic keys) for the receiver apparatus E, for example, can have been generated by reference to device-specific data or unambiguous device-specific data for a corresponding device (e.g. a UID of the device, a random number which has been generated by the corresponding device, or by reference to characteristic sensor data which have been calculated for the device—e.g. a calculated characteristic for a noise signal, which has been determined by a sensor of the device).

Sensor data for the receiver apparatus E and/or the system SYS, for example, can be detected by a sensor, which detects e.g. thermal noise on a circuit of the device, or which employs the noise of the sensor itself. For example, noise on an unused data interface or on a used data interface can also be employed. This can be, for example, a token ring network interface of a device, or a RS232 interface. Additionally, noise e.g. from a data acquisition hardware can be employed.

Alternatively or additionally, cryptographic data for a receiver apparatus E are a combination of device-specific data and receiver apparatus-specific data (e.g. a UID of the receiver apparatus, a random number which has been generated by the receiver apparatus, or which has been calculated by reference to sensor data for the receiver apparatus—e.g. a calculated characteristic for a noise signal, which has been determined by a sensor of the receiver apparatus). For example, it is also possible that, by means of device-specific data and/or receiver apparatus-specific data for the corresponding device, cryptographic data are determined in a reproducible manner. For example, by means of these device-specific data and/or receiver apparatus-specific data, a cryptographic protection (e.g. an encryption), by means of which the corresponding cryptographic data of a device are protected, can be removed (e.g. by decryption) and/or checked (e.g. by the checking of a digital signature). To this end, optionally, by reference to these data, a cryptographic key can be calculated, in order to permit the execution of the requisite cryptographic operations for this purpose.

Device-specific data of devices for the receiver apparatus E can be retrieved, for example, in conjunction with the retrieval of a device status of the device. Device-specific data and/or receiver apparatus-specific data are data which can only be forged with difficulty, e.g. a secret starting value or a characteristic of a noise signal (which is detected e.g. by a sensor or a manipulation-proofing module) which, upon any manipulation of the device, is modified such that, e.g. in response to the resulting modification of the characteristic, cryptographic data are invalidated or can no longer be accessed.

If, for example, an unauthorized party has replaced a device with a different and manipulated device, it will, for example, be extremely difficult for the characteristic of a noise signal of the original device to be duplicated or counterfeited by the manipulated device. For example, the noise signal characteristic (of the manipulated device) will then be employed to generate a cryptographic key. By means of the cryptographic key, it will be endeavored e.g. to decrypt cryptographic data. On the grounds that, by reference to the modified noise signal characteristic, it will not have been possible to generate the correct key for decryption, e.g. any decryption of cryptographic data will be unsuccessful as a result.

It is also possible e.g. for device-specific data or unambiguous device-specific data to be determined or replaced by means of a challenge-response method (e.g. in conjunction with the retrieval of a device status) wherein, for example, the method is configured on the device side and on the receiver apparatus side with corresponding initial values (e.g, wherein, in a protected memory of the device or the receiver apparatus, corresponding initial values are preconfigured, or these initial values are calculated and/or supplied by the protected memory), and corresponding device-specific data (e.g. a cryptographic key or an element of a cryptographic key) can be retrieved by the receiver apparatus.

Additionally, the transmitter apparatus S and/or the receiver apparatus E can respectively comprise an initialization module, or can employ a common initialization module. This initialization module is designed such that, e.g. in the case of a new device, cryptographic data are calculated, in the event that data for this device are to be received for the first time, or transmitted to the latter for the first time. These data can be generated e.g. by reference to the above-mentioned method (unambiguous device-specific data+ seed).

According to one variant, the transmitter apparatus S and/or the receiver apparatus E can also constitute virtual devices, which assume the corresponding interfaces and technical features for communication with the distributed database system (or network application). For example, corresponding virtual devices can be instantiated with a predefined configuration, wherein this configuration is determined or calculated in accordance with corresponding device information with respect to the physical device. For example, the term configuration is to be understood as those interfaces and functions which a corresponding virtual device is intended to deliver.

This can be executed, for example by means of a virtualization environment, such as e.g. VM-ware. In the event that a node on the distributed database system (or network application) communicates with a virtual device, the transmitter apparatus S or receiver apparatus E relays the corresponding information to the old device or legacy device wherein, prior to any relaying, the corresponding conversion and processing are executed, as described above. This is particularly advantageous for production machines, if the latter e.g. have no blockchain capability, but are nevertheless to be controlled by a blockchain-based control system. For example, the identification module can employ the corresponding virtual devices for this purpose, or the identification module is a component/element which is embodied by one or more virtual devices. Virtual devices behave in the manner of a node on the distributed database system (or network application), and emulate or supplement functions for physical devices which are absent from the latter for the purposes of communication or interaction with nodes on the distributed database system (or network application).

A corresponding identification module (with virtual devices) for a receiver apparatus E can be embodied, for example, as follows. The identification module is designed, by reference to data or the respective message content of first messages, to calculate an assignment of the virtual devices for which a corresponding first message is intended. Virtual devices comprise e.g. the conversion module and/or the second communication interface, or respectively comprise a dedicated virtual variant of the latter, or access the conversion module and/or the second communication interface, in order to transmit data, messages or message content to the physical device which is assigned to the corresponding virtual device.

A receiver apparatus with corresponding virtual devices can comprise, for example, the following features:
for example, a first communication interface, wherein
for example, the first network interface is designed to communicate with a distributed database system or network application,
for example, the first communication interface is designed to receive first messages or data from the distributed database system (or network application);
for example, virtual devices, wherein
for example, virtual devices are respectively assigned to a corresponding (physical) device (e.g. on the automation network AN),
for example, by reference to data or the respective message content (e.g. the target address of the corresponding message) of first messages, an assignment is calculated of the virtual devices for which a corresponding first message or data are intended;
for example, a conversion module, wherein
for example, the conversion module is designed to convert data or message content of the corresponding first message into a data format for the assigned device;
for example, a second communication interface, wherein
for example, the second communication interface is designed to transmit data and/or converted data and/or the converted message content and/or the message content of the corresponding first message (and/or the first message itself) to the device which is assigned to the corresponding first message.

A corresponding identification module for a transmitter apparatus S can be embodied, for example, as follows. The identification module is designed, by reference to data or the respective message content of first messages, to calculate an assignment of the physical device from which a message has been received. By reference to this assignment, it is then established which virtual device is intended to process and/or transmit a corresponding message. Virtual devices comprise the conversion module and/or the second communication interface, or respectively comprise a dedicated virtual variant of the latter, or access the conversion module and/or the second communication interface, in order to transmit data, messages or message content by means of the corresponding virtual device to the distributed database system (or network application).

A transmitter apparatus S with corresponding virtual devices can comprise, for example, the following features:
for example, a first communication interface, wherein
for example, the first network interface is designed to communicate with devices,
for example, the first communication interface is designed to receive first messages or data from devices;
for example, virtual devices, wherein
for example, virtual devices are respectively assigned to a corresponding (physical) device (e.g. on an automation network),
for example, by reference to data or the respective message content (e.g. the network address of the sender) of first messages, an assignment is calculated of the device which has transmitted a corresponding first message or data;
for example, a conversion module, wherein
for example, the conversion module is designed to convert data or message content of the corresponding first message into a data format for the distributed database system (or network application);
for example, a second communication interface, wherein
for example, the second communication interface is designed to communicate with a distributed database system (or network application),
for example, the second communication interface is designed to transmit data and/or converted data and/or the converted message content and/or the message content of the corresponding first message (and/or the first message itself) to the distributed database system (or network application).

The above-mentioned variants with virtual devices can, for example, omit the conversion module in the event that, for example, no data conversion is required.

Additionally, variants with virtual devices can respectively comprise a corresponding cryptography module, which comprises corresponding cryptographic data for a (physical and/or virtual) device, and/or for a plurality of (physical and/or virtual) devices. To this end, for example, a virtual device can respectively comprise a corresponding cryptography module, or virtual devices can access a common cryptography module.

The receiver apparatus E, for example, can be implemented passively or actively.

In the case of active implementation, for example, first messages are transmitted directly by the distributed database system (or network application) to the receiver apparatus E or the system SYS (or received by the receiver apparatus E or the system SYS). The corresponding messages can comprise e.g. an indication of the device on the automation network AN for which the corresponding message is intended.

In the case of passive implementation, for example, first messages are received indirectly by the receiver apparatus E or the system SYS. To this end, the receiver apparatus E or the system SYS detects or receives messages from the first network NW1, for example by means of a packet filter or a network analysis tool (e.g. Wireshark), or a tool for the retrieval of data packets from the network (e.g. WinPCap, libpcap). Corresponding messages e.g. are not directed to the receiver apparatus E (or the system SYS), or the network address thereof, but are directed to devices on the automation network (wherein e.g. a specific device is indicated in the message, or in the content thereof).

In order to establish whether, for example, a corresponding first message is intended for a device on the automation network AN, the receiver apparatus (or the system SYS) comprises, for example, a device database, which comprises a schedule of devices on the automation network AN. Additionally, device information on respective devices can be saved in this schedule. Device information can comprise, for example, general information on a device. This can include e.g. technical characteristics, such as capacity, production speed, energy consumption, accuracy of production, the location of the device, or a combination hereof. Alternatively or additionally, the corresponding device information can also comprise the most recently received or retrieved device status. If, for example, a device status has previously been received within a stipulated time interval, the further retrieval of a current device status can be omitted. If the stipulated time interval is 5 minutes and a device status for the device has been received 1 minute previously, for example, it is not necessary to receive a further device status until the stipulated time interval has elapsed.

Device information, for example, can also comprise corresponding device properties (e.g. current device properties).

The transmitter apparatus S, for example, can be implemented passively or actively.

In the case of active implementation, for example, first messages are transmitted directly by devices on the automation network to the transmitter apparatus S or the system SYS. The corresponding messages can comprise e.g. an indication of the network application or distributed database system (in the event of a plurality of such systems) or network (e.g. the first communication network) for which the corresponding message is intended.

In the case of passive implementation, for example, first messages are received indirectly by the transmitter apparatus S or the system SYS. To this end, the transmitter apparatus S or the system SYS detects or receives messages from the second network NW2, for example by means of a packet filter or a network analysis tool (e.g. Wireshark), or a tool for the retrieval of data packets from the network (e.g. WinPCap, libpcap). Corresponding messages e.g. are not directed to the transmitter apparatus S (or the system SYS), or the network address thereof, but are directed, for example, to another address or another device. It is possible, for example, that an element of an originally existing communication infrastructure has been replaced by the distributed database system (or network application), and that the corresponding devices or network addresses, to which it was intended that the corresponding first messages should be transmitted, no longer exist. Given that, additionally, the corresponding devices cannot be reconfigured without further action, the corresponding messages, in the absence of the transmitter apparatus S, would not be accessible for the new communication infrastructure or available for transmission to the latter.

The transmitter apparatus S can also comprise a device database (e.g. in an analogous manner to the receiver apparatus) in order to establish, for example, which device has sent a corresponding message. If, for example, messages are initially received passively, such information can be determined, for example, by reference to the sending address of the message. To this end, device information is retrieved e.g. by means of the sending address.

Embodiments of the invention advantageously permits e.g. legacy devices, no aspect of the configuration of which can be modified, to communicate with a new blockchain infrastructure. Data conversion is executed by the apparatus or system.

Additionally, apparatuses (e.g. the transmitter apparatus or receiver apparatus) or the system can respectively execute smart contracts for legacy systems or devices. In particular, devices can be endowed with a blockchain capability, with no modification to said devices whatsoever.

In particular, these apparatuses or the system comprise the requisite components for communication with a blockchain. These include, for example, a key memory or cryptography module with cryptographic keys or data, in order to execute the signing of transactions/messages for the blockchain or to verify the corresponding checksums.

According to one variant of implementation, a module, a plurality of modules, or all modules can be embodied in the form of software components or hardware components, or as a combination of hardware and software components.

Additionally, the system and/or modules and/or the transmitter apparatus and/or the receiver apparatus and/or the distributed database system and/or the network application and/or the network infrastructure of the network application and/or nodes of the network application and/or nodes of the distributed database system (e.g. blockchain nodes) and/or devices, for example, can respectively comprise a further component or a plurality of further components such as, for example, a processor, a memory unit, further communication interfaces (e.g. Ethernet, WLAN), an input device, particularly a computer keypad or a computer mouse, and a display device (e.g. a monitor). The processor, for example, can comprise a plurality of further processors which, in particular, can be employed for the embodiment of further exemplary embodiments.

The processor can be, for example, an ASIC, which has been configured in an application-specific manner for the functions of a respective module or all modules in the exemplary embodiment (and/or in further exemplary embodiments), wherein program components or program commands are particularly embodied in the form of integrated circuits. The processor can also be, for example, a FPGA which, particularly by means of program commands, is configured such that the FPGA embodies the functions of a respective module, or of all the modules in the exemplary embodiment (and/or in further exemplary embodiments).

In the above-mentioned exemplary embodiments, network interfaces can also be configured in the form of integral network interfaces. For example, the first communication interface NI1 of the system SYS and the first communication interface 210 of the receiver apparatus E and/or the second communication interface 340 of the transmitter apparatus S can be configured in the form of a first integral communication interface. For example, the second communication interface NI2 of the system SYS and the second communication interface 240 of the receiver apparatus E and/or the first communication interface 310 of the transmitter apparatus S can be configured in the form of a second integral communication interface. For example, the first integral communication interface and the second integral communication interface can be configured in the form of a common integral communication interface.

According to further variants, the transmitter apparatus S and/or the receiver apparatus E and/or the system SYS can be configured, for example, in the form of an integral component of one of the devices wherein, for example, the corresponding communication interface for communication with the corresponding device, for example, is a communication interface for a data bus (e.g. a PCI interface, a USB interface). For example, according to a variant of this type, legacy devices or devices can be connected directly to the distributed database system (or network application) wherein, for example, the transmitter apparatus S and/or the receiver apparatus E and/or the system SYS are integrated in a communication interface of the legacy device or the device (e.g. in the form of an ASIC or FPGA). The communication interface of the device can be, for example, an interchangeable network card wherein, for example, an old network card has been replaced by a corresponding communication interface according to embodiments of the invention. In other words, according to a variant of this type, a communication interface can comprise the transmitter apparatus S and/or the receiver apparatus E and/or the system SYS, or the communication interface SYS is configured in the form of the transmitter apparatus S and/or the receiver apparatus E and/or the system SYS.

According to a further potential variant of the transmitter apparatus, the transmitter apparatus comprises the following:

for example, a first communication interface, wherein
    for example, the first network interface is designed to communicate with devices,
    for example, the communication interface is designed to receive first messages or data from devices;
for example, an identification module, wherein
    for example, the identification module is designed, by reference to data or the respective message content of first messages, to calculate an assignment of which device has sent data or a corresponding first message;
for example, a conversion module, wherein
    for example, the conversion module is designed to convert data or message content of the corresponding first message into a data format for the distributed database system or for the network application,
    for example, the conversion module is designed to convert data specifically for the distributed database system or network application, by reference to the assigned device,
    for example, the conversion module is designed to execute a check as to which data formats can be processed by the distributed database system or network application, or by further distributed database systems or network applications;
    for example, the conversion module is designed to convert data into a data format which is compatible with the distributed database system or network application;
for example, a second communication interface, wherein
    for example, the second communication interface is designed to communicate with a distributed database system or network application,
    for example, the communication interface is designed to transmit converted data or converted message content to the distributed database system or network application.

According to a further potential variant of the transmitter apparatus, the transmitter apparatus comprises the following:

for example, a first communication interface, wherein
    for example, the first network interface is designed to communicate with devices,
    for example, the communication interface is designed to receive first messages or data from devices;
for example, an identification module (320), wherein
    for example, the identification module is designed, by reference to data or the respective message content of first messages, to calculate an assignment of which device has sent data or a corresponding first message;
for example, a conversion module (330), wherein
    for example, the conversion module is specifically designed to determine data format requirements for the device which is assigned to data and which e.g. are stipulated by the assigned device,
    for example, the conversion module is designed to determine, by means of a test result, those data formats which can be processed by distributed database systems or network applications,
    for example, the conversion module is designed, according to the test result and/or data format requirements, to convert data into a data format for a network application of the network applications, or for a distributed data base system of the distributed database systems;
for example, a second communication interface, wherein
    for example, the communication interface is designed to transmit converted data or converted message content to the distributed database system or network application.

For example, the conversion module can be designed to convert data or message content of the corresponding first message into a data format for the distributed database system or for a network application, wherein the data format e.g. is stipulated by the assigned device.

For example, the conversion module can be designed to select the (corresponding) distributed database system from the distributed database systems, or the (corresponding) network application from the network applications, by reference to the test result and/or data format requirements. For example, the second communication interface can be designed to transmit converted data and/or data to the selected (corresponding) distributed database system or the selected (corresponding) network application. In other words, for example, the network application is the selected network application, or the distributed database system is the selected distributed database system.

Data format requirements can be dictated, for example, by the assignment and/or by device properties (of the assigned device) which are saved in the assignment (or in an assignment data record).

In the event that, for example, a plurality of distributed database systems or a plurality of network applications fulfil data format requirements—and are respectively compatible with data format requirements—data can be converted e.g. for the respectively compatible distributed database systems or the respectively compatible network applications and/or respectively transmitted to the latter. The term compatible signifies, for example, that the respective distributed database system or the respective network application supports and/or can process at least one data format among the data format requirements. The data format indicates, for example, a format for data which can be processed by the network application or the distributed database system.

For example, alternatively or additionally, from the compatible distributed database systems or from the compatible network applications, a network application or distributed database system for data conversion (or the conversion of data) and/or for data transmission (of converted data or of data) can also be selected which fulfils an additional selection criterion. The selection criterion can be, for example, reliability, cryptographic requirements (e.g. key lengths employed, cryptographic protocols) or requirements for the corresponding infrastructure (e.g. the necessity for the presence of at least a stipulated number of nodes, or for the embodiment of the network application or the distributed database system e.g. in the form of a cloud system) which are to be supported by the network application or the distributed database system. For example, only a distributed database system or a network application is selected which delivers the optimum fulfilment of the selection criterion.

For example, the second communication interface can be designed to communicate with distributed database systems (e.g. the distributed database system, or further distributed database systems, or the selected distributed database system) or with network applications (e.g. the network application, or further network applications, or the selected network application) in order to retrieve e.g. supported data formats for network applications or distributed database systems and/or to transmit converted data.

Specific examples whereby e.g. data conversion can be executed, can be embodied in an analogous manner to examples of the receiver apparatus.

Data can thus comprise, for example, the first messages or first message, or the message content of the first message, or data on a communication link.

By means of embodiments of the invention, in particular, it is possible for a decentralized infrastructure to be coupled with old or legacy devices. By means of embodiments of the invention, in particular, coupling of such old devices to a new, blockchain-based infrastructure can be executed. This is advantageous, for example, for energy supply systems, the control of which can be converted to a blockchain infrastructure, without the necessity, however, for the replacement of each individual device in the existing energy supply system. Embodiments of the invention make it possible, for example, for a device to transmit messages (e.g. incorporating control commands or status messages for the processing of control commands) to the distributed database system or network application, wherein the transmitter apparatus is communicatively arranged between the devices and the distributed database system (or network application) and executes the assignment and/or transmission of the respective messages to the distributed database system (or network application). In particular, the corresponding message content or data are also converted into a data format which is compatible with the distributed database system (or network application). In particular, it is not necessary for devices to be adapted to the new infrastructure.

For example, device properties of the assigned device dictate that data can be saved in one or more data formats in the distributed database system or network application. For example, data format requirements can stipulate that data from the assigned device are to be saved in a XML format or a JSON format, but not in a binary format. For example, the distributed database system supports a XML format, whereas the network application supports only a proprietary binary format. The second communication interface and/or the conversion module firstly execute a check as to which data formats, which are supported by the distributed database system or network application (wherein the term supported signifies, for example, which data formats can be processed by the distributed database system or network application), also correspond to the data format stipulations of the data format requirements of the assigned device. According to one variant, for example, the communication interfaces then communicates, for example by reference to the test result which is determined by means of this check, to which distributed database system (a plurality of distributed database systems can also exist) or to which network application converted data are to be transmitted. This test result, alternatively, can also be determined by the conversion module or the identification module in the same manner, and delivered e.g. to the second communication interface.

For example, the second communication interface can be designed, according to the test result, to transmit converted data or the converted message content to the distributed data base system or a further distributed database system, or to the network application or a further network application.

Each of the transmitter apparatuses and/or receiver apparatuses and/or distributed database systems (or exemplary embodiments, embodiments or variants thereof) and/or network applications described can additionally comprise, for example a configuration interface and/or a ventilator and/or a monitoring module. By means of the configuration interface, for example, updates or firmware versions can be incorporated. By means of the ventilator, for example, the receiver apparatus E and/or the distributed database system can be cooled. By means of the monitoring module, the status and/or the operational performance of a corresponding transmitter apparatus and/or a corresponding receiver apparatus and/or the distributed database system can be monitored and e.g. saved in a file (e.g. a logging file).

FIG. 4 shows a fourth exemplary embodiment of the invention, in the form of a flow diagram of the method according to embodiments of the invention.

The method is embodied in a computer-assisted manner.

Specifically, in this exemplary embodiment, a method is embodied for the computer-assisted reception of messages.

The method comprises a first process step 410 for the reception of first messages from a distributed database system by means of a first communication interface. First messages are saved, for example, in a data format (e.g. a XML data format) of the distributed database system or a network application.

The method comprises a second process step 420 for the calculation of an assignment for first messages, wherein said calculation determines the devices for which a corresponding first message is intended.

The method comprises a third process step 430 for the conversion of message content of the corresponding first message into a data format for the assigned device. The data format, in particular, is a proprietary data format of the devices.

The third process step, in particular, is an optional process step. This is the case, for example, in the event that the message content of the corresponding first message does not require conversion, or the message content or corresponding first message assumes a data format which can be processed by devices. In such a case, converted message content in the fourth process step corresponds to the (unconverted) message content of the corresponding first message, or the corresponding first message is transmitted to the corresponding device(s) in the form of a second message.

The method comprises a fourth process step 440 for the transmission of converted message content to the device to which the corresponding first message is assigned.

FIG. 5 shows a fifth exemplary embodiment of the invention, in the form of a flow diagram of the method according to embodiments of the invention.

The method is embodied in a computer-assisted manner.

Specifically, in this exemplary embodiment, a method is embodied for the computer-assisted transmission of messages.

The method comprises a first process step 510 for the reception of first (further) messages from devices by means of a first communication interface. These messages are saved, for example, in a proprietary data format for the devices.

The method comprises a second process step 520 for the calculation of an assignment by reference to the respective message content of the first (further) message, wherein a calculation is executed as to which device has transmitted a corresponding first further message.

The method comprises a third process step 530 for the conversion of message content of the corresponding first (further) message into a data format for the distributed database system (or network application), wherein the data format e.g. can be processed by the distributed database system (or network application). The data format can be e.g. a XML data format, for which an appropriate XML schema is available. Nodes on the distributed database system (or network application) can thus evaluate e.g. a device status of one of the devices on the automation network, in order to send e.g. a message to the corresponding automation network or device, according to the device status.

The third process step, in particular, is an optional process step. This is the case, for example, in the event that the message content of the corresponding first message does not require conversion, or the message content or corresponding first message assumes a data format which can be processed by the distributed database system (or network application). In such a case, converted message content in the fourth process step corresponds to the (unconverted) message content of the corresponding first message, or the corresponding first message is transmitted to the distributed database system (or network application) in the form of a second message.

The method comprises a fourth process step 540 for the transmission of converted message content to the distributed database system (or network application).

The methods described with respect to FIG. 4 and FIG. 5 share a common feature in that both, in the interests of unambiguity confirmation in a system SYS, are only executed in the event that it proceeds, from a previously executed test as to whether a further system WSYS can execute the same conversion as the system SYS, that said conversion cannot be executed by the further system WSYS.

In one embodiment of the invention, this test is executed by means of the status synchronization channel ZS. By means of the channel ZS, the system SYS is synchronized with the further system WSYS and, in the event of the failure of synchronization, it is concluded that synchronization is not (or no longer) being executed by the further system WSYS. In this case, the methods described in FIG. 4 and FIG. 5 can be executed by the system SYS. The system SYS thus becomes the active system, by which conversion is executed.

Optionally, the system SYS can additionally transmit a "fault recovery signal" to the inactive further system WSYS. Immediately the further system—e.g. further to the successful execution of a fault recovery process—has itself recovered an active status, execution of the methods described in FIG. 4 and FIG. 5 can be resumed by the further system WSYS. In this case, the system SYS again becomes inactive with respect to conversion, and restricts its activity to synchronization with the further system WSYS. In this embodiment, the further system WSYS assumes the role of a master coupling, and the system SYS assumes the role of a back-up coupling.

Alternatively, the system SYS can remain active, and execute the synchronization of the further system WSYS. In this embodiment, the roles of the two systems are interchanged, and the respectively active system, with respect to coupling, and particularly with respect to conversion, assumes the role of a master coupling, and the respectively inactive system assumes the role of a back-up coupling.

According to one variant of embodiment, testing is executed by means of a transmission control module SP. A check is executed as to whether first messages or data sent by devices have been successfully saved in the distributed database system within a predefined time period or in a predefined number of data blocks. In the event of the failure of saving, it is concluded that conversion is not (or no longer) being executed by the further system WSYS. In this case, the methods described in FIG. 4 and FIG. 5 can be executed by the system SYS. The system SYS thus becomes the active system, by which conversion is executed. With respect to these roles and the interchange thereof, appropriately, the same technical considerations apply as to the preceding exemplary embodiment.

Testing and the resulting interchange of roles between the system SYS and a further system WSYS can be executed by an unambiguity confirmation module ES, which can be configured as a separate device or a separate computer program product, particularly for execution in a cloud. In this exemplary embodiment, separate instructions for the activation of a previously inactive system and, optionally, for the inactivation of a previously active system. In this example, control of which system is to execute the methods described in FIG. 4 and FIG. 5 is assumed by the separate device or computer program product.

It is also possible for the methods described in FIG. 4 and FIG. 5 to be divided, and e.g. for the method described in FIG. 4 to be executed by the system SYS and the method described in FIG. 5 to be executed by the further system WSYS. Thus, for example, a load distribution can be achieved.

Embodiments of the invention relate, for example, to a gateway or network adapter, by means of which old devices or legacy devices can be connected to a distributed database system (or network application) such as a blockchain, with no necessity for any change to the configuration of old devices.

Correspondingly, for example, messages which are transmitted or received by the distributed database system (or network application) become transactions. Correspondingly, for example, messages which are transmitted to the distributed database system (or network application) become transactions.

If, for example, the second network NW2, with its devices (FIGS. 1-3), for example, is also a distributed database system (or network application), it is thus possible, for example, by means of embodiments of the invention (apparatuses, system and methods), for two different distributed database systems (or network applications) to communicate with each other.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A system comprising:
   a) at least one receiver apparatus or a transmitter apparatus;
   wherein the receiver apparatus comprises:
      a first communication interface, which is designed to receive data from a network application;
      a conversion module which is designed:
         to determine a conversion test result for the data, according to a device which is assigned to the data, by determination, to establish whether and/or how the data are to be converted into a data format for the device which is assigned to the data,
         according to the conversion test result, to convert the data into a data format for the device which is assigned to the data;
      a second communication interface, which is designed to transmit converted data to the device which is assigned to the data;
   wherein the transmitter apparatus comprises:
      a first communication interface which is designed to receive first messages or data from devices;
      an identification module, which is designed, by reference to the data or the respective message content of the first messages, to calculate an assignment of which device has sent the data or a corresponding first message;
      a conversion module, which is designed:
         specifically for the device which is assigned to the data or the corresponding first message, to determine data format requirements which are stipulated by the assigned device,
         to determine a test result as to which data formats are processed by distributed database systems or network applications,
         according to the test result and/or the data format requirements, to convert the data or the corresponding first message into a data format for a network application of the network applications, or for a distributed database system of the distributed database systems;
      a second communication interface, which is designed to transmit the converted data or the converted message content to the distributed database system or network application;
   b) at least one cryptography module, which is designed to comprise cryptographic data which are assigned to devices; and
   c) an unambiguity confirmation module, wherein the unambiguity confirmation module is configured to check activity on a further system, wherein the further system executes the same conversion as the system, and wherein the unambiguity confirmation module is configured only to permit the activity of the at least one receiver or transmitter apparatus in the event that the further system is not active.

2. The system as claimed in claim 1, wherein the receiver apparatus retrieves a device status from the device which is assigned to the data, and transmission to the assigned device is executed, according to the device status retrieved.

3. The system as claimed in claim 2, wherein the device status comprises a data record with respect to available device resources and/or current device properties.

4. The system as claimed in claim 1, wherein a transmission from the receiver apparatus to the corresponding device is executed, in the event that predefined requirements for corresponding data are fulfilled by the assigned device wherein, for example, the fulfilment of predefined requirements is checked by reference to the device status.

5. The system as claimed in claim 4 wherein, by reference to cryptographic data, at least a proportion of data for an assigned device are checked and/or decrypted by the receiver apparatus wherein, for example, for the purposes of checking and/or decryption, the corresponding cryptographic data are loaded by reference to the assigned device.

6. The system as claimed in claim 5, wherein the conversion module is designed, by reference to the device, to execute a check as to which data among the data are processed by the device.

7. The system as claimed in claim 1 wherein corresponding cryptographic data are loaded by the transmitter apparatus by reference to the assigned device and wherein, by means of the corresponding cryptographic data, at least a proportion of the data or a proportion of the message content of the corresponding first message are cryptographically protected in a device-specific manner for the assigned device.

8. The system as claimed in claim 1, wherein the receiver apparatus comprises an identification module which is specifically designed, by reference to data, to calculate an assignment of devices for which the data are intended.

9. The system as claimed in claim 8, wherein the identification module is particularly designed by reference to the data, to calculate an assignment or the assignment, for example for the determination of the assigned device.

10. The system as claimed in claim 1, wherein the distributed database system is a blockchain and wherein the converted message content which is transmitted and/or received by the distributed database system are transactions.

11. The system as claimed in claim 1, wherein at least a proportion of devices are devices on an automation network.

12. The system as claimed in claim 1, wherein the unambiguity confirmation module is designed to check activity on the further system by means of a status synchronization channel, which is employed for the synchronization of at least an element of the status of the system and the further system.

13. The system as claimed in claim 12, wherein the unambiguity confirmation module is designed to synchronize cryptographic data which are assigned to devices.

14. The system as claimed in claim 12, wherein the unambiguity confirmation module is designed to permit the activity of the at least one receiver or transmitter apparatus, in the event of the occurrence of an error in synchronization with the further system.

15. The system as claimed in claim 1, wherein the unambiguity confirmation module is configured in the form of a separate device or a separate computer program product.

16. The system as claimed in claim 1, wherein the unambiguity confirmation module comprises a transmission control module which is designed to execute a check as to whether first messages or data sent by devices have been successfully saved in the distributed database system within a predefined time period or in a predefined number of data blocks.

17. The system as claimed in claim 16, wherein the unambiguity confirmation module is designed to permit the activity of the at least one receiver or transmitter apparatus, in the event that saving is not executed within the predefined time period or in the predefined number of data blocks.

18. A method for the computer-assisted reception of data, comprising the following process steps:
providing the system according to claim 1,
checking whether the further system is executing conversion, and executing the following steps only when conversion is not being executed by the further system;
receiving data or first messages from a distributed database system or network application by means of a first communication interface;
determining a conversion test result for the data, wherein:
the conversion test result is determined according to a device which is assigned to the data or a corresponding first message,
it is determined whether and/or how the data or the corresponding first message are to be converted into a data format for the device which is assigned to the data or the corresponding first message,
the data or the corresponding first message are converted into a data format for the device which is assigned to the data or the corresponding first message, according to the conversion test result; and
transmitting the converted data and/or the data or the corresponding first message and/or the first message to the device which is assigned to the corresponding first message or data.

19. A method for the computer-assisted transmission of messages or data, comprising the following process steps:
providing the system according to claim 1,
checking whether the further system is executing conversion, and executing the following steps when conversion is not being executed by the further system;
receiving data or first messages from devices by means of a communication interface;
calculating an assignment by reference to the data or the respective message content of first messages, wherein a calculation is executed as to which device has sent the data or a corresponding first further message;
determining data format requirements, which are specifically determined for the device which is assigned to the data or the corresponding first message, wherein data format requirements e.g. are dictated by the assigned device;
determining a test result as to which data formats are processed by distributed database systems or network applications;
converting the data or the corresponding first message into a data format for a network application of the network applications, or for a distributed database system of the distributed database systems, according to the test result and/or the data format requirements; and
transmitting the converted data or the converted message content to the distributed database system or network application.

20. A computer program product, comprising a computer readable hardware storage device having computer readable program code stored therein, said program code executable by a processor of a computer system to implement a method, having program commands for the execution of the method as claimed in claim 18.

21. A provision apparatus for the computer program product as claimed in claim 20, wherein the provision apparatus saves and/or provides the computer program product.

* * * * *